United States Patent
Park et al.

(10) Patent No.: US 11,367,872 B2
(45) Date of Patent: Jun. 21, 2022

(54) PRECURSOR AND METHOD FOR PREPARING NI BASED CATHODE MATERIAL FOR RECHARGEABLE LITHIUM ION BATTERIES

(71) Applicants: Umicore, Brussels (BE); Umicore Korea Ltd., Cheonan (KR)

(72) Inventors: Areum Park, Cheonan (KR); JiHye Kim, Cheonan (KR); Song-Yi Han, Cheonan (KR); Jens Martin Paulsen, Cheonan (KR); Kyung-Tae Lee, Cheonan (KR); Randy De Palma, Olen (BE)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 152 days.

(21) Appl. No.: 16/562,694

(22) Filed: Sep. 6, 2019

(65) Prior Publication Data

US 2020/0020944 A1    Jan. 16, 2020

Related U.S. Application Data

(63) Continuation-in-part of application No. 16/487,525, filed as application No. PCT/EP2018/053638 on Feb. 14, 2018.

(30) Foreign Application Priority Data

Mar. 3, 2017    (EP) .................................. 17159083

(51) Int. Cl.
*H01M 4/505*    (2010.01)
*H01M 4/525*    (2010.01)
(Continued)

(52) U.S. Cl.
CPC .......... *H01M 4/505* (2013.01); *H01M 4/366* (2013.01); *H01M 4/38* (2013.01); *H01M 4/525* (2013.01);
(Continued)

(58) Field of Classification Search
CPC ...................................................... H01M 4/505
See application file for complete search history.

(56) References Cited

U.S. PATENT DOCUMENTS

2006/0083989 A1    4/2006 Suhara et al.
2014/0054495 A1    2/2014 Paulsen et al.
(Continued)

FOREIGN PATENT DOCUMENTS

EP    2492243 A1    8/2012
JP    2000203947 A    7/2000
(Continued)

OTHER PUBLICATIONS

JPO; Office Action for Japanese Patent Application No. 2019-547657 dated Sep. 28, 2020, 4 pages.
(Continued)

*Primary Examiner* — Peter F Godenschwager
(74) *Attorney, Agent, or Firm* — NK Patent Law

(57) ABSTRACT

A crystalline precursor compound for manufacturing a lithium transition metal based oxide powder usable as an active positive electrode material in lithium-ion batteries, the precursor having a general formula $Li_{1-a}((Ni_z(Ni_{0.5}Mn_{0.5})_y Co_x)_{1-k}A_k)_{1+a}O_2$, wherein A comprises at least one element of the group consisting of: Mg, Al, Ca, Si, B, W, Zr, Ti, Nb, Ba, and Sr, with $0.05 \leq x \leq 0.40$, $0.25 \leq z \leq 0.85$, $x+y+z=1$, $0 \leq k \leq 0.10$, and $0 \leq a \leq 0.053$, wherein said crystalline precursor powder has a crystalline size L, expressed in nm, with $15 \leq L \leq 36$.

13 Claims, 6 Drawing Sheets

(51) Int. Cl.
  H01M 4/36    (2006.01)
  H01M 4/58    (2010.01)
  H01M 10/0525 (2010.01)
  H01M 4/38    (2006.01)
  H01M 4/02    (2006.01)

(52) U.S. Cl.
  CPC ....... *H01M 4/582* (2013.01); *H01M 10/0525* (2013.01); *H01M 2004/028* (2013.01)

(56) References Cited

U.S. PATENT DOCUMENTS

| | | |
|---|---|---|
| 2014/0131617 A1 | 5/2014 | Park et al. |
| 2016/0056458 A1 | 2/2016 | Tamura et al. |
| 2016/0365571 A1 | 12/2016 | Kim et al. |

FOREIGN PATENT DOCUMENTS

| | | |
|---|---|---|
| JP | 2014509046 A | 4/2014 |
| JP | 2014529326 A | 11/2014 |
| JP | 2016044120 A | 4/2016 |
| KR | 20130011892 A | 1/2013 |
| KR | 20160130415 A | 11/2016 |
| TW | 201620183 A | 6/2016 |
| TW | 201640725 A | 11/2016 |
| WO | 2004092073 A1 | 10/2004 |
| WO | 2011112758 A1 | 9/2011 |
| WO | 2013026454 A1 | 2/2013 |
| WO | 2015128722 A1 | 9/2015 |
| WO | 206055911 A1 | 4/2016 |
| WO | 2016116862 A1 | 7/2016 |
| WO | 2016116867 A1 | 7/2016 |
| WO | 2016148096 A1 | 9/2016 |

OTHER PUBLICATIONS

ISA/EP; International Search Report and Written Opinion for International Patent Application No. PCT/EP2018/053638, dated Mar. 26, 2018, 8 pages.

WIPO; International Search Report and Written Opinion for International Patent Application No. PCT/EP2018/053638, dated Sep. 3, 2019, 6 pages.

PRECURSOR AND METHOD FOR PREPARING NI BASED CATHODE MATERIAL FOR RECHARGEABLE LITHIUM ION BATTERIES

CROSS-REFERENCE TO RELATED APPLICATIONS

This application is a continuation in part of U.S. patent application Ser. No. 16/487,525, filed Aug. 21, 2019, which is a national stage application of International Patent Application No. PCT/EP2018/053638, filed on Feb. 14, 2018, which claims the benefit of European Patent Application No. 17159083.9, filed on Mar. 3, 2017.

TECHNICAL FIELD AND BACKGROUND

This invention relates to a crystalline precursor of and a method to prepare a Ni-excess "NMC" cathode powdery material on a large-scale and at low cost. By "NMC" we refer to lithium-nickel-manganese-cobalt-oxide. The Ni-excess NMC powder can be used as a cathode active material in lithium-ion rechargeable batteries. Batteries containing the cathode materials of the invention enhance their performances, such as providing a higher cycle stability and a low content of soluble base.

The global market of lithium-ion batteries (LIBs) has been concentrating on large batteries. The term "large batteries" refers to applications in electric vehicles (EV), as well as in stationary power stations. These EV or large stationaries require much larger power sources than the previously dominating batteries for portable devices such as laptops, smartphones, tablets, etc. Therefore, there are fundamentally different requirements for the "large battery" cathode materials, not only performance-wise, but also from the point of view of resource scarcity. Previously, $LiCoO_2$ (LCO) was used as the cathode material for most rechargeable lithium batteries. However, LCO is not sustainable for the large batteries due to the limited cobalt resources—as approximately 30% of the cobalt production worldwide is currently already used for batteries, according to the Cobalt Development Institute. Therefore, lithium-nickel-cobalt-manganese-based oxide (NMC), having roughly the stoichiometry $LiM'O_2$, where $M'=Ni_xMn_yCo_z$, (when not doped) has become a promising alternative cathode material due to its less critical resources situation. This material has excellent cycling properties, long-life stability, high energy density, good structural stability, and low cost. Various compositions of NMC have been developed to improve the energy density of NMC by relatively increasing the amount of Ni, without losing its advantages mentioned before. Typical NMC based materials are "111", "442", "532", and "622": "111" with $M'=Ni_{1/3}Mn_{1/3}Co_{1/3}$, "442" with $M'=Ni_{0.4}Mn_{0.4}Co_{0.2}$, "532" with $M'=Ni_{0.5}Mn_{0.3}Co_{0.2}$, "622" with $M'=Ni_{0.6}Mn_{0.2}Co_{0.2}$. The NMC cathode materials contain less cobalt because it is replaced by nickel and manganese.

Since nickel and manganese are cheaper than cobalt and relatively more abundant, NMC potentially replaces $LiCoO_2$ in the large batteries.

NMC cathode materials can roughly be understood as a solid state solution of $LiCoO_2$, $LiNi_{0.5}Mn_{0.5}O_2$ and $LiNiO_2$, corresponding to the general formula $Li_{1-a}[Ni_z(Ni_{0.5}Mn_{0.5})_yCo_x]_{1+a}O_2$, where "z" stands for the Ni(3+)-excess, as in $LiNi_{0.5}Mn_{0.5}O_2$ Ni is divalent and in $LiNiO_2$ Ni is trivalent. At 4.3V, the nominal capacity of $LiCoO_2$ and $LiNi_{0.5}Mn_{0.5}O_2$ is about 16 OmAh/g, against 220 mAh/g for $LiNiO_2$. The reversible capacity of any NMC compound can be roughly estimated from these capacities. For example, NMC 622 can be understood as $0.2\ LiCoO_2+0.4\ LiNi_{0.5}Mn_{0.5}O_2+0.4\ LiNiO_2$. Thus, the expected capacity equals $0.2\times160+0.4\times160+0.4\times220=184$ mAh/g. The capacity increases with "Ni-excess", where "Ni-excess" is the fraction of 3-valent Ni; for example, in NMC 622, the Ni-excess is 0.4 (if we assume lithium stoichiometry with a Li/(Ni+Mn+Co) atomic ratio of 1.0). Obviously, the capacity increases with the Ni-excess, so that at the same voltage, Ni-excess NMC possesses a higher energy density than LCO, which means less weight or volume of cathode material is required for a certain energy demand when using Ni-excess NMC instead of LCO. Additionally, due to the lower price of nickel and manganese compared to cobalt, the cost of cathode per unit of delivered energy is much reduced. Thus, the higher energy density and lower cost of Ni-excess NMC—by contrast to LCO—is more preferred in the "large battery" market.

There are two major trends to achieve a high energy density. One trend is to increase the Ni-excess up to very high values. In NCA-$LiNi_{0.8}Co_{0.15}Al_{0.05}O_2$, for example, the Ni-excess is very high; it is 0.8 as all Ni is 3 valent. In NC91-$LiNi_{0.9}Co_{0.1}O_2$ the Ni-excess is even 0.9. These cathodes have very high capacities even at relatively low charge voltage. As an example, NC91 has capacities as high as 220 mAh/g at 4.3V. These cathodes have a major disadvantage: if the battery is fully charged and the cathodes are in the delithiated state, the values of "x" in the resulting $Li_{1-x}MO_2$ are high. These highly delithiated cathodes are very unsafe when in contact with electrolyte. Once a certain temperature in the battery has been reached, the cathodes decompose and deliver oxygen which combusts the electrolyte. Basically, the electrolytes reduce the cathode. After the reaction—as there is large Ni-excess—most of the transition metal is 2 valent. Schematically—each mol of cathode can deliver one mol oxygen to combust the electrolyte: $NiO_2$+electrolyte→$NiO$+{$H_2O$, $CO_2$}. The safety issue of batteries is mostly caused by the combustion heat of the electrolyte.

The other trend to achieve a high energy density is to increase the Ni-excess towards intermediate values. Typical values for the Ni-excess range from about 0.25 to about 0.6. This region we will refer as "high Ni-excess". The current invention refers to a process to prepare NMC with high Ni-excess. The capacity at 4.2V or 4.3V of high Ni-excess NMC is less than that of "very high" Ni-excess compound (with Ni-excess of superior to 0.6). However, the capacity can also be increased by increasing the charge voltage. The resulting delithiated cathodes are safer than the delithiated very high Ni-excess cathodes mentioned above. Whereas Ni tends to form NiO, Ni-M' tends to form stable $M'_3O_4$ compounds. These compounds have a higher final oxygen stoichiometry thus less oxygen is available to combust the electrolyte. As a result, the safety of high Ni-excess cathodes is improved even if a higher charge voltage is applied.

The prior art teaches that the cycle stability of NMC at high voltage may be insufficient, however, it can be improved by applying a surface coating, as disclosed e.g. in WO2016-116862. The surface coating basically stabilizes the surface against unwanted side reactions between electrolyte and cathode during cycling.

As the capacity of NMC material increases with Ni-excess, "Ni-excess" NMC cathode materials, like NMC 532 and NMC 622, possess a higher capacity in batteries than with less Ni, as for example NMC 111 (having a Ni-excess of 0). However, the production becomes more and more difficult with increasing Ni content. As an example—very high Ni-excess cathode materials like NCA cannot be prepared in air or using $Li_2CO_3$ as a lithium source. Because of the low thermodynamic stability of Li in Ni-excess material, "soluble bases" occur easily on the surface of the final product, the concept of "soluble base" being explicitly discussed in e.g. WO2012-107313: the soluble base refers to surface impurities like lithium carbonate ($Li_2CO_3$) and lithium hydroxide (LiOH). These soluble bases are a concern since especially residual $Li_2CO_3$ causes poor cycling stability in the lithium ion battery. Therefore, the preparation of very high Ni-excess cathode materials is performed in $CO_2$ free oxidizing gas (typically oxygen) to reduce the soluble base content at increasing temperature, and LiOH is used as a lithium source instead of $Li_2CO_3$, Contrary to this, the low Ni NMC 111 can easily be prepared in normal air and using a low-cost $Li_2CO_3$ precursor.

The preparation of NMC 532 (having a Ni-excess of 0.2) is more difficult than NMC 111, but NMC 532 can still be processed at large-scale through a low cost and simple solid state reaction under air. This process—referred to as "direct sintering"—is the firing of a blend of a mixed metal precursor (for example $M'(OH)_2$ precursor) and a lithium source. The lithium source is preferably $Li_2CO_3$, as in the production of NMC 111, due to its low price.

Another promising Ni-excess compound is NMC 622, whose Ni-excess is 0.4 and its capacity is higher than that of NMC 532. However, compared to NMC 532 and NMC 111, it is very difficult to prepare NMC 622 with low soluble base using a large-scale and low cost process such as direct sintering. As discussed in U.S. Pat. No. 7,648,693, these bases may come from unreacted $Li_2CO_3$ present in the reagents of the lithium sources, usually $Li_2CO_3$ or $LiOH.H_2O$, where $LiOH.H_2O$ normally contains 1 wt % $Li_2CO_3$ impurity. These bases can also originate from the mixed transition metal hydroxides that are used as the transition metal source in the production. The mixed transition metal hydroxide is usually obtained by co-precipitation of transition metal sulfates and an industrial grade base such as NaOH. Thus, the hydroxide can contain a $CO_3^{2-}$ impurity. During sintering with a lithium source the $CO_3^{2-}$ residual reacts with lithium and creates $Li_2CO_3$. As during sintering $LiM'O_2$ crystallites grow, the $Li_2CO_3$ base will be accumulated on the surface of these crystallites. Thus, after sintering at high temperature in a high Ni-excess NMC, like NMC 622, carbonate compounds remain on the surface of the final product. This base can dissolve in water, and therefore the soluble base content can be measured by a technique called pH titration, as discussed in U.S. Pat. No. 7,648,693.

The presence of soluble base in the final NMC material causes a serious gas generation in full cells, which is usually called "bulging". This may result in a poor cycle life of the battery, together with safety concerns. Therefore, in order to use Ni-excess NMC materials for large battery applications, an effective and low cost processing method is necessary that avoids the formation of such high soluble base contents.

The direct sintering method mentioned before is performed in trays in a continuous manner. "Trays" are ceramic vessels which contain the blend or product during sintering, they are sometimes also referred to as "saggers". The trays are continuously fed to a furnace, and during the movement through the conveyor furnace the reaction towards the final sintered $LiM'O_2$ proceeds. The sintering cost depends strongly on the throughput of the sintering process. The faster the trays move across the furnace (referred to as the "sintering time") and the more blend the trays carry (referred to as the "tray load"), the higher the throughput of the furnace is. Moreover, the furnace has a high investment cost. Therefore, if the throughput is small, the furnace depreciation and operating cost significantly contributes to the total process cost. In order to reduce manufacturing cost, a high throughput is thus desired.

Many large-scale direct sintering production methods for Ni-excess NMC have been tried. As the Ni-excess increases, the direct sintering becomes more difficult. It is observed that high Ni-excess NMC requires long sintering times and a low tray load to be successful. Since high Ni-excess NMC has a too low "tray throughput", the direct sintering production is not available to produce a high quality material at an acceptable low cost. For example, when using a $Li_2CO_3$ precursor, the throughput limitation can be traced back to the relatively high thermodynamic stability of $Li_2CO_3$ causing slower reaction kinetics when the reaction proceeds. The mechanism that slows down the reaction speed is a gas phase limitation, since due to a low $CO_2$ equilibrium partial pressure, the removal of $CO_2$ hinders the reaction. Therefore, the application of other lithium sources having a lower thermodynamic stability could solve this issue. $LiOH.H_2O$ is such a precursor and the corresponding $H_2O$ equilibrium partial pressures are higher than those of $CO_2$. Thus, $LiOH.H_2O$ is widely applied as a precursor for direct sintering higher Ni containing cathode materials. This typical process to prepare high Ni-excess NMC is for example applied in US2015/0010824. $LiOH.H_2O$ with a low $Li_2CO_3$ impurity as a lithium source is blended with the mixed transition metal hydroxide at the target composition, and sintered at high temperature under an air atmosphere. In this process, the base content of such high Ni-excess NMC final product (like NMC 622) is much reduced.

However, $LiOH.H_2O$ makes excess vapor during heating and sintering steps, resulting in various problems. For example, $LiOH.H_2O$ has a low melting point of about 400° C. At that temperature the reactivity of a metal precursor (like M'OOH) with $LiOH.H_2O$ is not high. As a result molten $LiOH.H_2O$ is present at the same time as large amounts of $H_2O$ vapor are created. These vapor streams physically cause a de-mixing of the blend, resulting in a final product having an inhomogeneous chemical composition, where especially the Li/M' atomic ratio will vary within a tray. The larger the tray load is, the more severe this issue becomes. Additionally, there is also a heat limitation issue. If the tray load is high then the blend in the center of the trays will be less sintered. Thus—at high tray throughput—inhomogeneously sintered product will be achieved. The larger the tray load is, the more severe these issues become.

For a high quality final cathode material powder with a homogeneous composition, the variation of Li/M' atomic ratio and sintering degree of particles within the powder needs to be limited. Therefore, in order to achieve a high quality product a low tray load is required. If we compare the direct firing using $Li_2CO$ precursor and $LiOH.H_2O$ precursor, then the $LiOH.H_2O$ allows a higher tray throughput, but in an economical, mass production process the tray throughput must still be higher. The tray based conveyor furnace consists of a continuous firing kiln with a motor driven roller way, which is good for consistent high-volume production of NMC. However, generally there is a heat transfer limitation of the blend in the trays because both tray and product are good heat insulators, resulting in an inhomogeneous state of sintering in the final product. Furthermore, this heat transfer issue will be more severe if the firing time is reduced in order to increase throughput. Therefore, improved sintering methods to enhance the transport of heat within the blend are necessary for a large-scale preparation of high quality NMC.

Rotary furnace technology provides a faster transport of heat within the blend. It also prevents de-mixing of the blend. A typically used indirect-fired sintering rotary furnace is basically a metallic rotating tube which is heated from the outside, such as disclosed in U.S. Pat. No. 7,939,202. Cold blend or product is transported towards the hot zone of the tube, and within the tube the blend or product continuously moves, and is continuously heated, thereby preventing a de-mixing which prevents an inhomogeneous Li/M' atomic ratio. Thus, a rotary furnace has much less heat transfer limitations, and provides a much higher throughput and has a low operating cost per production capacity for an intrinsically lower investment cost. Rotary furnaces are also very compact and allow to increase production capacity without need to use more land. However, as said before, direct sintering requires relatively long sintering times and a relatively high temperature, (for example exceeding 800° C. for NMC 622) to obtain a high quality product. It is difficult to obtain a long sintering time in a rotary furnace. Also, at the high sintering temperature the lithium in a lithiated transition metal oxide will react with the tube material and cause tube corrosion. Therefore, indirect-fired sintering rotary furnaces are not suitable for direct sintering.

Besides, direct sintering also split firing has been proposed. U.S. Pat. No. 7,648,693 proposes a split method, where the firing is conducted in two steps: a first lithiation at relatively low temperature, like 700° C., and a second step of sintering at a higher temperature. In this patent, a large-scale preparation of $LiM'O_2$ with $M'=Ni_{0.27}(Mn_{0.50}Ni_{0.50})_{0.53}Co_{0.2}$ is achieved with a final product that is almost free of soluble base, resulting in improved cycling stability. The split method could thus be a potential way to prepare e.g. NMC 622 free of soluble base and at a low cost. In the split method, all lithium is added to the blend before the $1^{st}$ sintering. Under such conditions, it is practically impossible to fully react the metal precursor with the $Li_2CO_3$ at reasonable high throughput. Therefore, the split method is not usable for the large-scale production of NMC 622 with $Li_2CO_3$ as a lithium source because excessive amounts of preheated air have to be pumped through the reactor. Practically, the split method is limited to lower Ni-excess NMC, such as NMC 532.

A further variation of the split method is suggested in U.S. Pat. No. 9,327,996B2. The method for producing NMC—as is disclosed in U.S. Pat. No. 9,327,996B2—provides a step of firing a lithium-containing carbonate blend in a rotary furnace to produce a lithiated intermediate product. Rotary firing gives a large benefit for the $1^{st}$ sintering. It allows for lower cost and excellent production efficiency. However, in case of high Ni-excess NMC, the preparation of a fully lithiated intermediate product is not possible because it is impossible to finish the lithiation reaction when using $Li_2CO_3$ as a lithium source. Thus, the residual $Li_2CO_3$ content after the $1^{st}$ sintering is too high. During a $2^{nd}$ sintering at high throughput, it will be practically impossible to remove sufficient $Li_2CO_3$ thus the soluble base content of the final product will be too high. The final product will have a poor performance due to high bulging and poor cycling stability.

Therefore, the object of the present invention is to provide a low cost and efficient manufacturing process making use of an inventive intermediate product, to supply lithium transition metal oxide cathode materials having a Ni-excess, and especially suitable for higher voltage battery applications, where the charge voltage is at least 4.3V.

SUMMARY

Viewed from a first aspect, the invention can provide a crystalline precursor compound or intermediate product for manufacturing a lithium transition metal based oxide powder usable as an active positive electrode material in lithium-ion batteries, the precursor having a general formula $Li_{1-a}((Ni_z(Ni_{0.5}Mn_{0.5})_yCo_x)_{1-k}A_k)_{1+a}O_2$, wherein A comprises at least one element of the group consisting of: Mg, Al, Ca, Si, B, W, Zr, Ti, Nb, Ba, and Sr, with $0.05 \leq x \leq 0.40$, $0.25 \leq z \leq 0.85$, $x+y+z=1$, $0 \leq k \leq 0.10$, and $0 \leq a \leq 0.053$, wherein said crystalline precursor powder has a crystalline size L, expressed in nm, with $15 \leq L \leq 36$. The crystalline precursor may have a $Li_2CO_3$ content of at most 0.4 wt %. In an embodiment, $0.35 \leq z \leq 0.50$. In another embodiment, $0.03 \leq a \leq 0.053$. In an additional embodiment, $0.15 \leq x \leq 0.20$. The crystalline precursor compound of the previous embodiments may have an integrated intensity ratio I003/I104<1, wherein I003 and I104 are the peak intensities of the Bragg peaks (003) and (104) of the XRD pattern of the crystalline precursor compound. Also, the precursor compound may have an integrated intensity ratio I003/I104<0.9. In another embodiment, the precursor compound may have a ratio R of the intensities of the combined Bragg peak (006, 102) and the Bragg peak (101) with R=((I006+I102)/I101) and 0.5<R<1.16. In all of these embodiments, the precursor may also have a crystalline size L expressed in nm, with $25 \leq L \leq 36$.

Viewed from a second aspect, the invention can provide a method for preparing a positive electrode material having the general formula $Li_{1-a'}M'_{1+a'}O_2$, with $M'=(Ni_z(Ni_{0.5}Mn_{0.5})_yCo_x)_{1-k}A_k$, wherein $x+y+z=1$, $0.05 \leq x \leq 0.40$, $0.25 \leq z \leq 0.85$, A is a dopant, $0 \leq k \leq 0.1$, and $0.10 \leq a' \leq 0$, the method comprising the steps of:

providing a M'-based precursor prepared from the co-precipitation of metal salts with a base;

mixing the M'-based precursor with either one of LiOH, $Li_2O$ and $LiOH \cdot H_2O$, thereby obtaining a first mixture, whereby the Li to transition metal ratio in the first mixture is between 0.9 and 1.0, sintering the first mixture in an oxidizing atmosphere in a rotary kiln at a temperature between 650 and 850° C., for a time between ⅓ and 3 hours, thereby obtaining the crystalline precursor powder (or intermediate product) of the first aspect of the invention, optionally, mixing the crystalline precursor powder with either one of LiOH, $Li_2O$ and $LiOH \cdot H_2O$, thereby obtaining a second mixture, and sintering the second mixture or the crystalline precursor in an oxidizing atmosphere at a temperature between 800 and 1000° C., for a time between 6 and 36 hours, whereby the positive electrode material having the general formula $Li_{1-a'}M'_{1+a'}O_2$ as defined above is obtained, in a particular method embodiment, a method is provided for preparing a positive electrode material comprising a core material having the general formula $Li_{1-a'}M'_{1+a'}O_2$, with $M'=(N_z(Ni_{0.5}Mn_{0.5})_yCo_x)_{1-k}A_k$, wherein $x+y+z=1$, $0.05 \leq x \leq 0.40$, $0.25 \leq z \leq 0.85$, A is a dopant, $0 \leq k \leq 0.1$, and $-0.10 \leq a' \leq 0$, and a coating comprising a metal M"-oxide, the method comprising the steps of the method mentioned before for providing the core material, and additionally the steps of either:

A1) providing a third mixture comprising the core material being obtained by the method mentioned before and a compound comprising M", and A2) heating the third mixture to a sintering temperature between 600° C. and 800° C.; or B1) providing a fourth mixture comprising the core material being obtained by the method mentioned before, a fluorine-containing polymer and a compound comprising M", and B2) heating the fourth mixture to a sintering temperature between 250 and 500° C., or C1) providing a fifth mixture comprising the core material obtained by the method mentioned before, an inorganic oxidizing chemical compound, and a chemical that is a Li-acceptor, and C2) heating the fifth mixture at a temperature between 300 and 800° C. in an oxygen comprising atmosphere. In this step the heating temperature may be limited to 350 to 450° C.

In this particular method the compound comprising M" in either one of steps A1) and B1) may be either one or more of an oxide, a sulfate, a hydroxide and a carbonate, and M" may be either one or more of the elements Al, Ca, Ti, Mg, W, Zr, B, Nb, and Si. In particular, it may be $Al_2(SO_4)_3$. Also in this method, the compound comprising M" in either one of steps A1) and B1) may be a nanometric alumina powder having a D50 of inferior to 100 nm and a surface area of at least 50 $m^2$/g. Also, the fluorine-containing polymer provided in step B) may be either one of a PVDF homopolymer, a PVDF copolymer, a PVDF-HFP polymer (hexa-fluoro propylene) and a PTFE polymer, and wherein the amount of fluorine-containing polymer in the fourth mixture is between 0.1 wt % and 2.0 wt %. In this method also, in step C1) the inorganic oxidizing chemical compound may be $NaHSO_5$, or either one of a chloride, a chlorate, a perchlorate and a hypochloride of either one of potassium, sodium, lithium, magnesium and calcium, and the Li-acceptor chemical may be either one of $AlPO_4$, $Li_3AlF_6$ and $AlF_3$. More preferably, both the inorganic oxidizing chemical compound and the Li-acceptor chemical may be the same compound, being either one of $Li_2S_2O_8$, $H_2S_2O_8$ and $Na_2S_2O_8$. In this method also, in step C1) a nanosized $Al_2O_3$ powder may be provided as a further Li-acceptor chemical.

In an embodiment of the different methods, in the rotary kiln an air flow is applied between 0.5 $m^3$/kg and 3.5 $m^3$/kg, and preferably between 1.0 $m^3$ kg and 2.5 $m^3$/kg. In another embodiment of the different methods, the step of sintering the second mixture may be performed in a tray conveyor furnace wherein each tray carries at least 5 kg of mixture. Also, it may be preferred that between the step of providing a M'-based precursor and the step of mixing the M'-based precursor with either one of LiOH, $Li_2O$ and $LiOH.H_2O$ the M'-based precursor is subjected to a roasting step at a temperature above 200° C. in a protective atmosphere, such as under $N_2$. In some embodiments, after this roasting step the transition metals in the M'-based precursor have a mean oxidation state of superior to 2.5 and a content of $H_2O$ of inferior to 15 wt %. Also, after this roasting step the transition metals in the M'-based precursor may have a mean oxidation state of superior to 2.7 and a content of $H_2O$ of inferior to 5 wt %.

DETAILED DESCRIPTION

Figure 1:
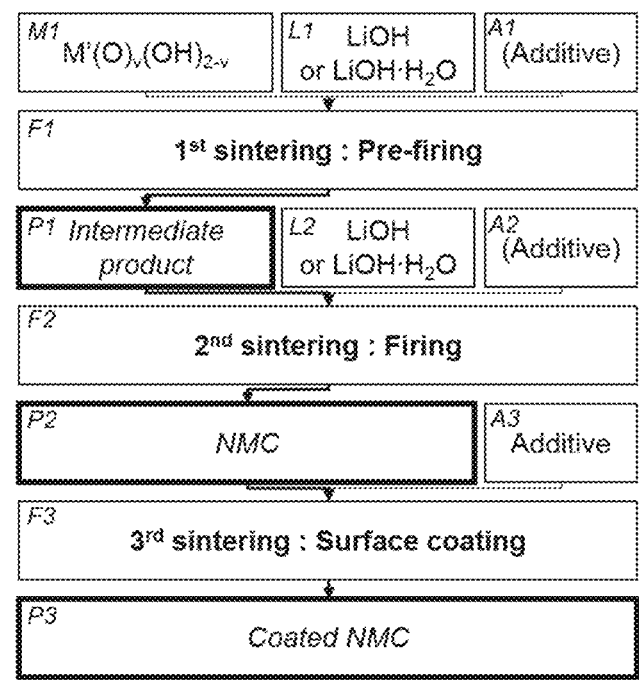
FIG. 1: Process flow chart of Manufacturing Example 3

The current patent discloses an improved split firing method where the $1^{st}$ sintering is done using a rotary furnace resulting in a crystalline precursor (intermediate product) which is sintered in a $2^{nd}$ sintering. The use of a crystalline precursor increases the reaction rate between the mixed metal precursor and the lithium source. Thus, the temperature can be lowered. The crystalline precursor is less reactive so corrosion of the metal tube is reduced. To produce NMC with good quality and high throughput, a double sintering method is conducted. First, the mixed transition metal source is blended with a source of Li and then sintered. Then, in the $2^{nd}$ sintering, the crystalline precursor is mixed with $LiOH.H_2O$ in order to correct the Li/M' atomic ratio to the final target composition. In consequence, high Ni-excess NMC with a low soluble base content is obtained on a large-scale production through the double sintering method which uses a crystalline precursor.

Manufacturing Example 1 (Prior Art—Counterexample)

The following description gives an example of the standard manufacturing procedure of NMC powders when applying a conventional direct sintering process which is a solid state reaction between a lithium source, usually $Li_2CO_3$ or $LiOH.H_2O$, and a mixed transition metal source, usually a mixed metal hydroxide $M'(OH)_2$ or oxyhydroxide M'OOH (with M'=Ni, Mn and Co), but not limited to these hydroxides, in a typical configuration, the direct sintering method comprises the following steps:

1) Blending of the mixture of precursors: the lithium source and the mixed transition metal source are homogenously blended for 30 minutes by a dry powder mixing process, 2) Sintering the blends in trays: the powder mixture is loaded in trays and sintered at 900° C. for 10 hours under dry air atmosphere in a furnace. The dry air is continuously pumped into the equipment at a flow rate of 20 L/h.

3) Post-treatment: after sintering, the sintered cake is crushed, classified and sieved so as to obtain a non-agglomerate NMC powder.

The direct sintering is generally conducted in a tray based furnace. For reducing the heat transfer limitation which causes inhomogeneous distribution of Li component and poor electrochemical performance, a low tray load is required. The invention observes that the direct sintering method is not applicable for the large scale production of most Ni-excess NMC material (having a Ni-excess z of superior to 0.25) that does not contain an excess of soluble base.

Manufacturing Example 2 (Counterexample)

This example provides a crystalline precursor (lithium deficient sintered precursor) to prepare high Ni-excess NMC on a large-scale by double sintering. The process includes among others two sintering steps:

1) $1^{st}$ blending: to obtain a lithium deficient sintered precursor, $Li_2CO_3$ and the mixed transition metal source are homogenously blended for 30 minutes.

2) $1^{st}$ sintering: the mixture from the $1^{st}$ blending step is sintered at 900° C. for 10 hours under dry air atmosphere in a tray based furnace. The dry air is continuously pumped into the equipment at a flow rate of 40 L/h. After the $1^{st}$ sintering, the sintered cake is crushed, classified, and sieved so as to ready it for the $2^{nd}$ blending step. The product obtained from this step is a lithium deficient sintered precursor, meaning that the Li/M' atomic ratio in LiM'$O_2$ is less than 1. The composition of this intermediate product is verified by a standard ICP test.

3) $2^{nd}$ blending: the lithium deficient sintered precursor is blended with $LiOH.H_2O$ in order to correct the Li stoichiometry in the intermediate product to the final target composition of $Li_{1.07}(Ni_{0.4}(Ni_{0.5}Mn_{0.5})_{0.4}Co_{0.2})_{0.983}O_2$ (NMC 622).

4) $2_{nd}$ sintering: the blends (from step 3) are sintered at 850° C. for 10 hours under dry air atmosphere in a tray based furnace. The dry air is continuously pumped into the equipment at a flow rate of 40 L/h.

5) Post treatment: after the $2^{nd}$ sintering, the sintered cake is crushed, classified, and sieved so as to obtain a non-agglomerated NMC powder.

Manufacturing Example 3 (Example According to the Invention)

This invention discloses a process to obtain high Ni-excess NMC with a low soluble base content by a double firing method and is illustrated in FIG. 1. The double firing includes a $1^{st}$ sintering (F1) which delivers an intermediate product (P1), and a second sintering delivering the final lithium metal oxide (P2). First, a transition metal precursor (M1) is mixed with a lithium source (L1). Transition metal precursors are selected from hydroxides, oxyhydroxides, carbonates, mixed oxide, etc. Preferable Ni, Mn, and Co are present and well mixed at atomic scale. The lithium source is selected from lithium hydroxide, lithium hydroxide hydrate, or lithium oxide. The lithium source is essentially free of $Li_2CO_3$. Additionally additives (A1) like $Al_2O_3$, MgO, etc. may be added for obtaining a doped final material. Additives can be oxides, hydroxides, carbonates, sulfates, etc. A $1^{st}$ sintering step (F1)—which is the pre-firing—is applied and provides an intermediate product (P1). After that, the intermediate product pre-fired product is blended with an additional lithium source (L2). The lithium source is selected from lithium hydroxide, lithium hydroxide hydrate, or lithium oxide. The lithium source is essentially free of $Li_2CO_3$. Additionally additives or dopants (A2) may be added. A $2^{nd}$ sintering step (F2)—which is the firing—is applied and provides the final lithium transition metal oxide (P2).

For producing an NMC at high throughput with high quality on a large-scale, the $1^{st}$ sintering is carried out in a rotary furnace or kiln. This improves the non-uniform Li/M' atomic ratio effect, and also allows very high throughput because the heat transfer issue is resolved in a rotary furnace. A product in a rotary furnace has a short residence time. Typical residence times in the heated zone of a rotary furnace are at least 20 minutes and typically less than 3 hours. If the residence time is too short, the reaction is not complete. If the residence time is too long, the throughput is insufficient. A typical temperature range for the $1^{st}$ sintering is 650° C. to 850° C. If the temperature is too low, the reaction is not complete. If the temperature is too high, the metal of the tube tends to react with the lithiated NMC.

The intermediate product has a target Li/M' atomic range from 0.9 to 1.0. The $1^{st}$ sintering in the rotary furnace uses an oxidizing gas, preferably air. However, if high Ni-excess cathodes are the target, oxygen might be a preferred choice.

During the $2^{nd}$ sintering, the intermediate product is sintered to achieve the final lithium transition metal oxide. First, the intermediate product is blended with a source of lithium to obtain the final Li/M' atomic ratio target value. Then, the mixture is fired to obtain a well sintered product. The $2^{nd}$ sintering is typically done using ceramic trays and a suitable furnace. Furnaces can be large chamber furnaces where stacks of trays are fired. More suitable are roller hearth kilns where trays with product are carried across the furnace. Alternatively, pusher kilns can be applied where carts with stacks of trays are carried across the furnace. Other furnace designs can be applied as well. Less desired are rotary furnaces. The rotary furnace has a short residence time, which might not allow to achieve a well-sintered high quality product. Another issue linked to rotary furnaces are the sintering temperatures. The sintering temperatures needed during the $2^{nd}$ sintering are relatively high, and still higher temperatures would be required if the residence time is short. Under such conditions, metal tubes tend to react with lithiated product and metal corrosion is observed. After the $2^{nd}$ sintering, NMC powder is achieved having a low soluble base and on a large-scale.

The invention observes that the properties of the intermediated sintered product strongly influence the performance of the final product in batteries. Particularly, the soluble base content of the final product is strongly related to the conditions during the $1^{st}$ sintering. The $1^{st}$ sintering temperature, furnace type, tray loading, and the ratio of lithium to the mixed transition metal source can be chosen appropriately to obtain a final product of high quality and with a high throughput. For example, if the ratio of lithium to metal source is too high, the reaction between the mixed transition metal source and the lithium source doesn't finish and results in unreacted and molten lithium sources, which can attack the inner wall of a furnace. At the same time, it causes agglomeration of NMC material and uptake of $CO_2$ from the air, which induces a poor cycling performance in batteries. If on the contrary the ratio of lithium to metal is too low, a large amount of lithium is required to adjust the Li stoichiometry in the intermediate product to the final target composition during the $2^{nd}$ sintering. Because the lithium source causes an excess vapor evolution during heating, the final product has an inhomogeneous chemical composition. Therefore, the ratio of lithium to metal during the $1^{st}$ firing must be optimized to produce high quality NMC product. The properties of the NMC product using the intermediate sintered precursor will be checked by various parameters: the crystalline size of the product after the $1^{st}$ sintering step, the $Li_2CO_3$ content, and the cycling performance of the final product.

Furthermore, to reduce the $Li_2CO_3$ content in the final NMC material, $LiOH.H_2O$ as lithium source can be used in both of the $1^{st}$ and the $2^{nd}$ sintering steps. The double sintering using a combination of rotary and tray based furnace provides the large-scale production of NMC product with low soluble base content at low cost. Consequently, the throughput is much higher compared to the direct sintering method described in Manufacturing Example 1 and the double sintering method of Manufacturing Example 2 based only on conveyor furnaces. Thus, the use of the lithium deficient sintered precursor and applying the double firing method in this invention is less expensive and a more efficient manufacturing way for Ni-excess NMC.

In this invention, to reduce the soluble base in the final product, the mixed transition metal source, which is used during the $1^{st}$ blending may be roasted. It might be useful to reduce the amount of vapor, which evolves during the first firing. If a mixed hydroxide M'(OH)$_2$ precursor is roasted at 250° C., for example, then a M'OOH type precursor is achieved which evolves less H$_2$O. If in another example the precursor is roasted at 375° C., a mixed oxide is predominantly achieved, which does not evolve substantial amounts of vapor. The roasting can be performed in air, oxygen, nitrogen, or a dynamic vacuum. The roasted mixed transition metal source is blended with LiOH.H$_2$O and then sintered for the formation of a lithium deficient sintered precursor. When using the roasted mixed transition metal oxide, a final NMC material with low soluble base content is obtained in a large-scale production.

During the $1^{st}$ sintering, the firing time may also be optimized to guarantee the reaction processing forward to the maximum extent. In an embodiment, the total sintering time including heating and cooling is set in the range of 12 to 20 hours for the large-scale production of NMC. After the $1^{st}$ sintering, an intermediate sintered product is obtained. The product has a low content of Li$_2$CO$_3$ impurity. In an embodiment, it is determined by pH titration that the Li$_2$CO$_3$ content is less than 0.40 wt %, preferably less than 0.20 wt %. The intermediate product is a single phase lithium transition metal oxide having an ordered or disordered rock salt crystal structure. The composition is believed to be Li$_{1-a}$M'$_{1+a}$O$_2$. In an embodiment the Li/M' stoichiometric ratio is from 0.85 to 1.0, preferably from 0.9 to 1.0. The metal composition is Li$_{1-a}$((Ni$_z$(Ni$_{0.5}$Mn$_{0.5}$)$_y$Co$_x$)$_{1-k}$A$_k$)$_{1-a}$O$_2$, wherein x+y+z=1, 0.05≤x≤0.40, 0.25≤z≤0.85, A is a dopant, 0≤k≤0.10, and 0.00≤a≤0.053. The precursor has a crystalline size L expressed in nm that is dependent on the Ni-excess content z, with 25≤L≤36. The dopant may be either one or more of Mg, Al, Ca, Si, B, W, Zr, Ti, Nb, Ba, and Sr. These dopants can contribute to an improvement of the performance and safety of a battery containing the final cathode material made from the precursor.

In this invention, the double sintering method using a rotary furnace for the $1^{st}$ sintering increases the throughput of NMC, and uses much less space than a conveyor furnace. As the investment cost roughly correlates with the required space, the investment for the rotary furnace is much less than that of the conveyor furnace. Moreover, the precursor and lithium source can be filled easily and unloaded in the rotary furnace, whereas the conveyor furnace usually requires a complex tray filling equipment. Therefore, to use the double sintering method based on the rotary furnace for the $1^{st}$ sintering enhances the throughput of the final NMC product and reduces the investment cost dramatically.

Surface Coating Example 1

Referring back to FIG. 1, an aluminum coated NMC is obtained by blending and sintering a final lithium transition metal oxide powder (F3) and for example an aluminum source (A3). The aluminum source in this step can be a metal oxide (Al$_2$O$_3$) that may be combined with a compound selected from the group consisting of TiO$_2$, MgO, WO$_3$, ZrO$_2$, Cr$_2$O$_3$, V$_2$O$_5$, and mixtures thereof. The preferred source of aluminum is a nanometric alumina powder, for example fumed alumina. In the heating step, the mixture is heated at about 750° C. The sintering time is preferably at least 3 hours, more preferably at least 5 hours. The final product may have an Al content more than 0.3 mol % but less than 3.0 mol %.

Surface Coating Example 2

Referring back to FIG. 1, an aluminum and fluorine coated NMC is obtained by blending and subsequent sintering (F3) using an aluminum source (as described before) and a fluorine-containing polymer (A3). A typical example for such a polymer is a PVDF homopolymer or PVDF copolymer (such as HYLAR®) or SOLEF® PVDF, both from Solvay SA, Belgium). Another known PVDF based copolymer is for example a PVDF-HFP (hexa-fluoro propylene). Such polymers are often known under the name "Kynar®". Teflon—or PTFE—could also be used as polymer. For the sintering step, the sintering temperature of the mixture is at least 250° C., preferably at least 350° C. The sintering time here is preferably at least 3 hours, more preferably at least 5 hours. In the sintering step, the crystalline structure of the fumed alumina is maintained during the coating process and is found in the coating layer surrounding the lithium metal oxide core. Also, the fluorine-containing polymer is completely decomposed and lithium fluoride is formed, which is found in the surface layer of the particles. The obtained surface layer has the following function: the thin layer comprising LiF replaces the reactive surface base layer, thus reducing the base content practically to zero at the core's surface, and improving the overall safety.

Surface Coating Example 3

Referring back to FIG. 1, an aluminum and sulfate coated NMC is obtained by blending and subsequent sintering (F3) using an aluminum source (as described before) and a sulfur-containing source (A3). The sulfur-containing source in this step can be either one of Li$_2$S$_2$O$_8$, H$_2$S$_2$O$_8$ and Na$_2$S$_2$O$_8$. In the sintering step, the blend is heated between 300° C. and 500° C.—and preferably 375° C.—under air. The sintering time is at least 3 hours, and preferably at least 5 hours. The final product contains a coating of a sulfate and aluminum, which improves battery performance by decomposition of soluble surface base compounds.

Description of Analysis Methods:

A) pH Titration Test

The soluble base content is a material surface property that can be quantitatively measured by the analysis of reaction products between the surface and water, as is explained in WO2012-107313. If powder is immersed in water, a surface reaction occurs.

During the reaction, the pH of the water increases (as basic compounds dissolve) and the base content is quantified by a pH titration. The result of the titration is the "soluble base content" (SBC). The content of soluble base can be measured as follows: 2.5 g of powder is immersed in 100 ml of deionized water and stirred for 10 minutes in a sealed glass flask. After stirring to dissolve the base, the suspension of powder in water is filtered to get a clear solution. Then 90 m of the clear solution is titrated by logging the pH profile during addition of 0.1M HCl at a rate of 0.5 ml/min until the pH reaches 3 under stirring. A reference voltage profile is obtained by titrating suitable mixtures of LiOH and Li$_2$CO$_3$ dissolved in low concentration in deionized water. In almost all cases, two distinct plateaus are observed. The upper plateau with endpoint γ1 (in ml) between pH 8~9 is the equilibrium OH$^-$/H$_2$O followed by the equilibrium CO$_3^{2-}$/

$HCO_3^-$, the lower plateau with endpoint γ2 (in ml) between pH 4~6 is $HCO_3^-/H_2CO_3$. The inflection point between the first and second plateau γ1 as well as the inflection point after the second plateau γ2 are obtained from the corresponding minima of the derivative $d_{pH}/d_{Vol}$ of the pH profile. The second inflection point generally is near to pH 4.7. Results are then expressed in LiOH and $Li_2CO_3$ weight percent as follows:

$$Li_2CO_3 \text{ wt \%} = \frac{73.8909}{1000} \times (\gamma_2 - \gamma_1);$$

$$LiOH \text{ wt \%} = \frac{23.9483}{1000} \times (2 \times \gamma_1 - \gamma_2).$$

B) Valence State Titration Test

In this invention, the average valence state of products is determined by auto-titration using a Mettler Toledo Autotitrator DL70ES. The titrant is freshly made potassium dichromate water solution with a concentration of 0.01493 mol/L. Prior to titrant preparation, $K_2Cr_2O_7$ is dried at 104° C. for at 2 hours. The reducing agent is freshly prepared ferrous ammonium sulfate water solution. First, 156.85 g $Fe(NH_4)_2(SO_4)_2$ is weighed in a beaker. About 250 mL of nano-pure water and about 5 mL of 1:1 sulfuric acid are added. Heat may be applied to speed up the dissolution process. Afterwards, the solution is transferred into a IL volumetric flask and diluted to marked volume at 20° C. before use.

0.5 g to 3.0 g of NMC precursor sample is weighed into a digestion tube. 20 mL of freshly made $Fe(NH_4)_2(SO_4)_2$ solution and 10 mL of concentrated HCl are added into the digestion tube. Heat may be applied here for complete digestion of the sample. The solution is fully transferred into a 100 mL volumetric flask and diluted to the volume mark at 20° C. Afterwards, 10 mL of this solution is pipetted into a titration cup together with 5 mL of 1:1 HCl and 40 mL of nano-pure water to the cup. The NMC precursor sample solution is now ready for valence titration. The same procedure is repeated to prepare a reference sample solution (without NMC precursor) using exactly the same amount of $Fe(NH_4)_2(SO_4)_2$ solution, concentrated HCl, 1:1 HCl, nano-pure water under similar conditions. Using the above prepared $K_2Cr_2O_7$ solution, both NMC precursor sample solution and reference sample solution are titrated by using Mettler Toledo Autotitrator DL70ES. The volume of titrant consumed are recorded for each titration. The difference in volume is used for valence state calculation.

C) Karl Fischer Titration Test

The typical moisture content of precursor samples after drying is below 1 wt %, is determined by Karl Fischer at 250° C. KF 34739-Coulomat AG Oven is used as a reagent and added until the water in the samples is removed.

D) X-Ray Diffraction Test

The X-ray diffraction (XRD) pattern of a crystalline precursor powder sample is collected with a Rigaku X-Ray Diffractometer (Ultima IV) using a Cu Kα radiation source (40 kV, 40 mA) emitting at a wavelength of 1.5418 Å. The instrument configuration is set at: a 1° Soller slit (SS), a 10 mm divergent height limiting slit (DHLS), a 10 divergence slit (DS), and a 0.3 mm reception slit (RS). The diameter of the goniometer is 185 mm. Diffraction patterns are obtained in the 2θ range from 150 to 850 with a scan speed of 1.0° per minute and a step-size of 0.02° per scan.

In the present invention, the crystallite size L, expressed in nm, is obtained through the analysis of the width of individual diffraction peaks by the following Williamson-Hall (W-H) method. As described in 'Acta Metallurgica, 1953, VOL1, 22-31', Williamson and Hall proposed a method to extract the information on a crystallite size from the full width of half maximum (FWHM; P) of diffraction peaks. The detailed calculation method for estimating crystallite size follows that of 'Journal of Theoretical and Applied Physics, 2012, 6:6, Page 2 to 3 of 8'.

The FWHM of any diffraction peak can be described as a linear combination of the contributions from the lattice strain and the crystallite size through the Williamson-Hall (W-H) equation:

$$\beta \cos\theta = \frac{k\lambda}{L} + 4\varepsilon \sin\theta$$

β: FWHM (in radians)
λ: X-ray wavelength (CuKα=1.5418 Å)
θ: bragg angle (°)
L: crystallite size (nm)
ε: strain
K: constant, 0.9

A plot is drawn with 4 sin θ along the x-axis and β cos θ along the y-aixs using the XRD data on the peak (003) and the peak (104). The peak (003) and the peak (104) are at 17.0° to 20.2° and 43.0° to 45.5°. From the linear fit to the data, the crystalline size (L) was estimated from the y-intercept. Accordingly, W-H equation is converted to the following equation in the present patent.

A crystallite size L, expressed in nm, is calculated according to the Williamson-Hall equation:

$$L = \frac{K\lambda}{y_2 - \frac{y_2 - y_1}{x_2 - x_1} \times x_2}$$

x1: sin $\theta_1$ of the peak (003) of a R-3m space group from 17.0° to 20.0°, $\theta_1$ is a half of $2\theta_1$, wherein $2\theta_1$ is the center of the peak (003)

x2: sin $\theta_2$ of the peak (104) of a R-3m space group from 43.0° to 45.5°, $\theta_2$ is a half of $2\theta_2$, wherein $2\theta_2$ is the center of the peak (104)

y1: the product of β1 and cos $\theta_1$ of the peak (003) of a R-3m space group from 17.0° to 20.0°, wherein $\beta_1$ is FWHM, expressed in °, $\theta_1$ is a half of $2\theta_1$, wherein $2\theta_1$ is the center of the peak (003)

y2: the product of $\beta_2$ and cos $\theta_2$ of the peak (104) of a R-3m space group from 43.0° to 45.5°, wherein $\beta_2$ is FWHM, expressed in °, $\theta_2$ is a half of $2\theta_2$, wherein $2\theta_2$ is the center of the peak (104)

θ and β are obtained by a nonlinear curve fitting method in Origin 9.1 software with the Lorentz model. Kα2 peaks are not considered as a part of the peak.

$LaB_6$ (Lanthanum hexaboride) is used as a standard material in order to calibrate an instrumental broadening of diffraction peaks. The (011) peak in the range from 28° to 32° of the $LaB_6$ powder has FWHM (3) of 0.12640 and 2θ (center of the peak) of 30.3719°. The (111) peak in the range from 36° to 39° of the $LaB_6$ powder has β of 0.1357° and 2θ (center of the peak) of 37.4318°. Therefore, the calculated crystallite size from the (011) peak and (111) peak of the $LaB_6$ powder is 85.5 nm. Since the instrumental peak broadening affects β significantly, the instrument should be calibrated so as to provide abovementioned crystallite sizes of $LaB_6$ powder.

It is known that the structural model of $Li_{1-a}((Ni_z(Ni_{0.5}Mn_{0.5})_yCo_x)_{1-k}A_k)_{1+a}O_2$ is the α-NaFeO$_2$ structure (space group R-3m, no. 166) with Li in 3a sites, Ni, Co, and Mn randomly placed on 3b sites, and oxygen atoms on 6c sites (in general an NMC compound can be represented as $[Li]_{3a}[Ni_xCo_yMn_z]_{3b}[O_2]_{6c}$). The current invention however observes that the lithium deficient sintered precursor has a phenomenon of cation mixing, meaning that there is a high amount of Ni on Li 3a sites (being the sites within the layers predominantly filled by Li atoms). This differentiates our lithium deficient sintered precursor from the common lithium deficient material obtained during charge/discharge. The latter basically has little cation mixing. Generally, the degree of Li/M disorder can be roughly estimated by the intensity ratio of peak (003) (referred to as I003) to I104 (=intensity of peak (104)), as indicated in 'J. Electrochem. Soc. 140 (1993) 1862'. A large ratio of I003 to I104 means a low degree of Li/M' disorder. A systematic study on cation mixing was described by Jeff Dahn in Solid State Ionics 44 (1990) 87-97. U.S. Pat. No. 6,660,432 B2 gives an extended application of this method to evaluate the degree of Li/M disorder on Li—in excess transition metal oxide material. The idea of this method originates from the fact that the intensity I101 of peak (101) at 35° to 37.2° is rapidly attenuated while the combinational intensity of peaks (006) and peak (102) at 37.2° to 39.2° (I006 & I102) are enhanced when Ni atoms occupy "Li sites". Thus, a factor of R is introduced, which represents the ratio of I006 & I102 to I101. In Dahn's paper, it is demonstrated that the R factor increases rapidly as x decreases in LiNi$_{2-x}$O$_2$ material, where 1–x refers to the degree of cation mixing. A formula was deducted to express the relationship between R and x as follows:

$$R = \frac{4}{3}\frac{(1.6-x)^2}{x^2}$$

So the degree of cation mixing (1–x) is equivalent to R, and can be determined from the R value according to the formula.

In this invention, the two methods here above are used to evaluate the degree of cation mixing of the lithium deficient sintered precursors and the final products based on these precursors. The ratio I003/I104 and the value of R will be discussed below. It is observed that the degree of cation mixing is higher in a lithium deficient sintered precursor by contrast to the final product. Note that to calculate the ratio I003/I104 and the value of R, integrated XRD peaks are used.

E) Coin Cell Test

Coin cells are assembled in a glovebox which is filled with an inert gas (argon). A separator (Celgard 2320) is located between the positive electrode and a piece of lithium foil used as negative electrode. 1M LiPF$_6$ in EC/DMC (1:2 in volume) is used as electrolyte, dropped between separator and electrodes. Each cell is cycled at 25° C. using Toscat-3100 computer-controlled galvanostatic cycling stations (from Toyo). The coin cell testing schedule used to evaluate NMC samples is detailed in Table 1. The schedules use a 1 C current definition of 160 mA/g or 220 mAh/g and comprise three parts as follows:

Part I is the evaluation of rate performance at 0.1 C, 0.2 C, 0.5 C, 1 C, 2 C, and 3 C in the 4.3~3.0V/Li metal window range. With the exception of the 1$^{st}$ cycle where the initial charge capacity CQ1 and discharge capacity DQ1 are measured in constant current mode (CC), all subsequent cycles feature a constant current-constant voltage during the charge with an end current criterion of 0.05 C. A rest time of 30 minutes for the first cycle and 10 minutes for all subsequent cycles is allowed between each charge and discharge. The irreversible capacity $Q_{irr.}$ is expressed in % as:

$$Q_{Irr.} = \frac{(CQ1 - DQ1)}{CQ1} \times 100(\%)$$

The rate performance at 0.2 C, 0.5 C, 1 C, 2 C and 3 C is expressed as the ratio between the retained discharge capacity DQn, with n=2, 3, 4, 5 and 6 for respectively nC=0.2 C, 0.5 C, 1 C, 2 C and 3 C as follows:

$$nC - \text{rate} = \frac{DQn}{DQ1} \times 100(\%)$$

For example, $$3C - \text{rate (in \%)} = \frac{DQ6}{DQ1} \times 100$$

Part II is the evaluation of cycle life at 1 C. The charge cutoff voltage is set as 4.3 or 4.5V/Li metal. The discharge capacity at 4.3 or 4.5V/Li metal is measured at 0.1 C at cycles 7 and 34 and 1 C at cycles 8 and 35. Capacity fadings at 0.1 C and 1 C are calculated as follows and are expressed in % per 100 cycles:

$$0.1C \ QFad. = \left(1 - \frac{DQ34}{DQ7}\right) \times \frac{10000}{27} \text{ in \%/100 cycles}$$

$$1C \ QFad. = \left(1 - \frac{DQ35}{DQ8}\right) \times \frac{10000}{27} \text{ in \%/100 cycles}$$

Energy fadings at 0.1 C and 1 C are calculated as follows and are expressed in % per 100 cycles. $\overline{Vn}$ is the average voltage at cycle n.

$$0.1C \ EFad. = \left(1 - \frac{DQ34 \times \overline{V34}}{DQ7 \times \overline{V7}}\right) \times \frac{10000}{27} \text{ in \%/100 cycles}$$

$$1C \ EFad. = \left(1 - \frac{DQ35 \times \overline{V35}}{DQ8 \times \overline{V8}}\right) \times \frac{10000}{27} \text{ in \%/100 cycles}$$

Part III is an accelerated cycle life experiment using 1 C-rate for the charge and 1 C rate for the discharge between 4.5 and 3.0V/Li metal. Capacity and energy fading are calculated as follows:

$$1C/1C \ QFad. = \left(1 - \frac{DQ60}{DQ36}\right) \times \frac{10000}{27} \text{ in \%/100 cycles}$$

$$1C/1C \ EFad. = \left(1 - \frac{DQ60 \times \overline{V60}}{DQ36 \times 36}\right) \times \frac{10000}{27} \text{ in \%/100 cycles}$$

TABLE 1

| | | Charge | | | | Discharge | | | |
|---|---|---|---|---|---|---|---|---|---|
| Type | Cycle No | C Rate | End current | Rest (min) | V/Li metal (V) | C Rate | End current | Rest (min) | V/Li metal (V) |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 0.25 | 0.1 C | 10 | 4.3 or 4.5 | 0.10 | — | 10 | 3.0 |
| | 8 | 0.25 | 0.1 C | 10 | 4.3 or 4.5 | 1.00 | — | 10 | 3.0 |
| | 9~33 | 0.50 | 0.1 C | 10 | 4.3 or 4.5 | 1.00 | — | 10 | 3.0 |
| | 34 | 0.25 | 0.1 C | 10 | 4.3 or 4.5 | 0.10 | — | 10 | 3.0 |
| | 35 | 0.25 | 0.1 C | 10 | 4.3 or 4.5 | 1 00 | — | 10 | 3.0 |
| Part III | 36~60 | 1.00 | — | 10 | 4.3 or 4.5 | 1.00 | — | 10 | 3.0 |

The following examples illustrate the present invention in more detail.

Explanatory Example 1: NMC Samples Prepared Using Direct and Double Sintering

An NMC powder is prepared according to the above-mentioned "Manufacturing Example 1" with $Li_2CO_3$ as Li source. This sample is labelled NMC P1.1. Also, NMC powder is prepared as in "Manufacturing Example 2", based on a conveyor furnace for the $1^{st}$ and $2^{nd}$ sintering, and is labelled NMC P1.2. Finally, NMC powder is prepared by the "Manufacturing Example 2", but using a rotary furnace during the $1^{st}$ sintering and is labelled NMC P1.3. In all the Examples of this invention, mixed nickel-manganese-cobalt hydroxides (M'-hydroxides, where $M'=Ni_{0.6}Mn_{0.2}Co_{0.2}$ unless otherwise mentioned) are used as precursors, where M'-hydroxide is prepared by a co-precipitation in large scale continuous stirred tank reactor (CSTR) with mixed nickel-manganese cobalt sulfates, sodium hydroxide, and ammonia. In this case, the general formula of the M'-hydroxide is $(Ni_{0.4}(Ni_{0.5}Mn_{0.5})_{0.4}Co_{0.2})(O)_v(OH)_{2-v}$, with $0 \leq v \leq 1$.

Figure 2:
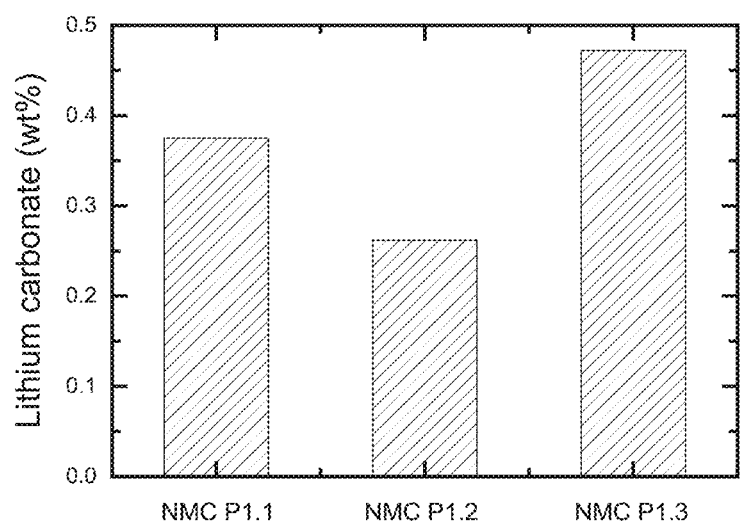
FIG. 2: Lithium carbonate content of NMC samples prepared using direct and double sintering

FIG. 2 presents the pH titration results of these NMC materials, where the weight percentage of lithium carbonate in the final NMC samples is plotted. The prepared powders have a large distinction in base content. NMC P1.2 sample has less lithium carbonate than NMC P1.1 because of the used double sintering method combined with a Li deficient precursor. As mentioned above, although a rotary furnace for the $1^{st}$ sintering step during the double sintering method is suitable for a large-scale production of NMC, NMC P1.3 sample has a higher residual lithium carbonate content than the other two samples. Therefore, it is useful to investigate if $LiOH \cdot H_2O$ instead of $Li_2CO_3$ as a lithium source for the $1^{st}$ sintering can reduce the soluble base content by its lower thermodynamic stability during the preparation of NMC, leading to good electrochemical performance. The following examples will illustrate this in detail.

Figure 3:
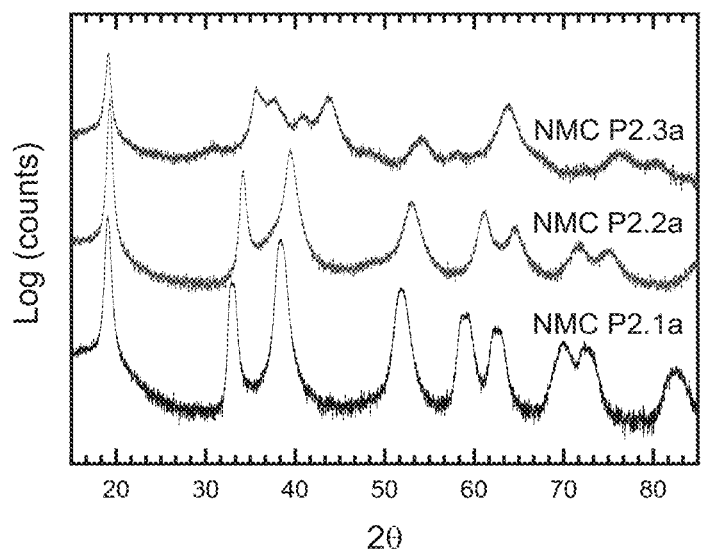
FIG. 3: XRD patterns of the pretreated transition metal samples

Explanatory Example 2: NMC Samples Prepared Using Pretreated Transition Metal Source and Direct Sintering An NMC powder is prepared based on a direct sintering method using a pristine mixed transition metal hydroxide type source and $LiOH \cdot H_2O$. This sample was prepared on small scale and is labelled NMC P2.1. Another NMC powder is prepared using a pretreated mixed transition metal source on a large-scale using direct sintering, and is labelled NMC P2.2. For the pretreatment of the metal source, a mixed transition metal oxide is heated at 150° C. under $N_2$ atmosphere in an oven. Finally, an NMC powder is manufactured using the same step in NMC P2.2, except that the heating temperature of the pretreated metal source is 250° C. It is labelled NMC P2.3. To investigate also the properties of pretreated transition metal sources themselves, we labelled the transition metal sources respectively NMC P2.1a (not heated), NMC P2.2a (heated at 150° C.), and NMC P2.3a (heated at 250° C.). FIG. 3 indicates the XRD patterns of the pretreated transition metal samples. After heating, the XRD peaks of the sources shifted, which means the oxidation state changed. In Table 2, the properties of the pretreated transition metal samples are shown in detail. The values of oxidation state are calculated using a 'Valence state titration' method.

TABLE 2

Properties of pretreated transition metal samples

| Sample | Oxidationstate ($n^+$) | $H_2O$ (%) | Mass loss (%) |
|---|---|---|---|
| NMC P2.1a | 2.17 | 17.413 | — |
| NMC P2.2a | 2.53 | 12.605 | 0.89% |
| NMC P2.3a | 2.71 | 2.805 | 9.49% |

NMC P2.1a has an oxidation state of 2.17, corresponding to the formula $(Ni_{0.4}(Ni_{0.5}Mn_{0.5})_{0.4}Co_{0.2})(O)_{0.17}(OH)_{1.83}$. After heating at 150° C., the oxidation state of NMC P2.2a is 2.53, and the formula becomes $(Ni_{0.4}(Ni_{0.5}Mn_{0.5})_{0.4}Co_{0.2})(O)_{0.53}(OH)_{1.47}$. The oxidation state of NMC P2.3a is 2.71, and the formula becomes $(Ni_{0.4}(Ni_{0.5}Mn_{0.5})_{0.4}Co_{0.2})(O)_{0.71}(OH)_{1.29}$. By increasing the pretreatment temperature, the transition metal source has a higher oxidation state than pristine source. Also, to investigate the moisture content of the pretreated precursors, their $H_2O$ content is analyzed after being heated at 300° C. NMC P2.3a has the lowest moisture content. By increasing the heating temperature, the mass loss of the precursor increases, compared to the initial weight. Table 3 summarizes the pH titration and coin cell results of NMC P2.1, P2.2, and P2.3. The coin cell test is conducted at the charge cutoff voltage of 4.5V/Li metal and a 1 C current definition of 160 mA/g.

TABLE 3

Performance of Explanatory Example 2

| Sample | DQ0.1 C (mAh/g) | 0.1 C QFad. (%/100) | 1 C QFad. (%/100) | Li$_2$CO$_3$ (wt %) |
|---|---|---|---|---|
| NMC P2.1 | 178.4 | 1.5 | 5.9 | 0.138 |
| NMC P2.2 | 174.3 | 4.4 | 10.2 | 0.306 |
| NMC P2.3 | 175.0 | 3.2 | 9.0 | 0.229 |

The weight percentage of lithium carbonate in the final NMC P2.2 sample is determined at 0.306 wt %, which is a high amount compared to the content of NMC P2.1. Because the NMC product is prepared by direct sintering on a large-scale, it contains large amounts of lithium carbonate. Thus, by using a roasted transition metal source with low H$_2$O content the amount of soluble base may be reduced, as is shown for the NMC P2.3 sample.

The presence of high soluble base and Li$_2$CO$_3$ contents in the final NMC material generally deteriorates the cycling performance. The coin cell test evaluates the cycle stability of NMC P2.1, NMC P2.2, and NMC P2.3 samples based on the capacity fade at 0.1 C and 1 C. It shows that the NMC P2.1 sample has 0.015% loss of discharge capacity per cycle at 0.1 C after 25 cycles and 0.059% loss for 1 C. The NMC P2.2 sample has 0.044% loss of discharge capacity per cycle at 0.1 C after 25 cycles and 0.102% loss for 1 C. When the heated mixed transition metal oxide at 150° C. is used as a metal source for large-scale production, it shows the worse cycling performance due to its high lithium carbonate content. Moreover, in case of NMC P2.3 prepared using the pretreated metal source at 250° C., it has a better cycle stability than NMC P2.2. Therefore, for the large-scale production, it is possible to produce NMC with enhanced battery performance by using a high-temperature pretreated transition metal source.

Example 1: NMC Samples Prepared Using Double Sintering

An NMC powder with formula Li$_{1.017}$M'$_{0.983}$O$_2$ with M'=Ni$_{0.4}$(Ni$_{0.5}$Mn$_{0.5}$)$_{0.4}$Co$_{0.2}$ is manufactured from an intermediate product with a Li/M' atomic ratio of 0.921 through the above-mentioned "Manufacturing Example 3": steps F1 and F2.

In the 1$^{st}$ sintering step, LiOH.H$_2$O is used as lithium precursor to produce the intermediate product in a rotary furnace. The mixture of transition metal source and lithium precursor is sintered at 820° C. for 2 hours of residence time and 1.316 rpm of rotation speed under dry air with a rate of 2 m$^3$/kg. The 2$^{nd}$ sintering is conducted at 860° C. for 10 hours under dry air atmosphere in a tray based furnace. The dry air is continuously pumped into the equipment at a flow rate of 40 L/h. The above prepared lithium deficient sintered precursor after the 1$^{st}$ sintering is labelled NMC E1p, and the final NMC sample after 2$^{nd}$ sintering is labelled NMC E1.

Figure 4:
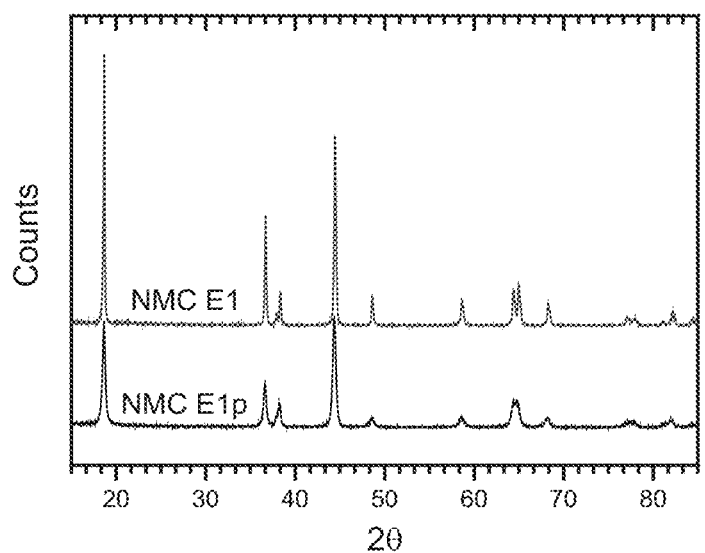
FIG. 4: XRD patterns of the intermediate and final product of NMC samples prepared using double sintering

FIG. 4 shows the XRD patterns of NMC E1p and NMC E1. The Bragg peaks (003), (101), (104) and doublet peak (006, 102) in that order are the highest in the patterns. Based on the intensity of these peaks, Table 4 summarizes the ratio of I003/I104 and R factor of the NMC E1p and E1 samples.

TABLE 4

I003/I104 ratio and R factor of Example 1

| Sample | I003/I104 | R factor |
|---|---|---|
| NMC E1p | 0.87 | 0.60 |
| NMC E1 | 1.02 | 0.40 |

As described above, the ratio of I003/I104 reflects the degree of Li to transition metal disorder. A large value of I003/I104 indicates a small degree of distortion. The intermediate product sample NMC E1p has a small I003/I104 ratio, which means there is more cation mixing in NMC E1p and more Ni on the Li sites. The same observation can be made when comparing the R factor. The intermediate product has a higher R factor by contrast to the final product. As discussed in Dahn's paper mentioned above, a high R factor means a high disordering of Li and transition metals. Thus, the higher value of R in NMC E1p confirms that there is a higher percentage of Ni on Li sites in the intermediate product. Table 5 summarizes the electrochemical performance and soluble base content of NMC E1. The coin cell test is conducted at the charge cutoff voltage of 4.5V/Li metal and a 1 C current definition of 160 mA/g.

TABLE 5

Performance of Example 1

| Sample | DQ0.1 C (mAh/g) | 0.1 C QFad. (%/100) | 1 C QFad. (%/100) | Li$_2$CO$_3$ (wt %) |
|---|---|---|---|---|
| NMC E1 | 179.5 | 0.8 | 5.4 | 0.206 |

The NMC E1 sample contains much less weight percentage of lithium carbonate than NMC P1.1, P1.2, and P1.3. It shows that there is 0.008% loss of discharge capacity per cycle at 0.1 C after 25 cycles and 0.054% loss for 1 C.

Figure 5:
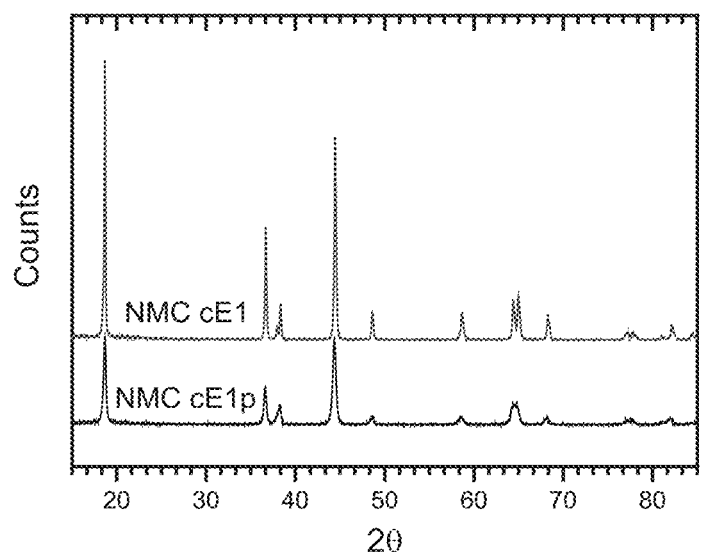
FIG. 5: XRD patterns of the intermediate and final product of NMC samples prepared using roasted transition metal source and double sintering

Comparative Example 1: NMC Samples Prepared Using Roasted Transition Metal Source and Double Sintering An NMC powder with formula Li$_{1.07}$M'$_{0.983}$O$_2$ with M'=Ni$_{0.4}$(Ni$_{0.5}$Mn$_{0.5}$)$_{0.4}$Co$_{0.2}$ is prepared using the steps in Example 1, except that the intermediate product has a Li/M' atomic ratio of 0.885 and that the mixed transition metal source is used after roasting at 250° C. under N$_2$ atmosphere in an oven for 24 hours. In the 1$^{st}$ sintering step, the mixture of transition metal source and LiOH.H$_2$O is sintered at 820° C. for 2 hours of residence time and 0.628 rpm of rotation speed under dry air with flow rate of 1.67 m$^3$/kg in a rotary furnace. The 2$^{nd}$ sintering is conducted at 865° C. for 10 hours under dry air atmosphere in a tray based furnace. The dry air is continuously pumped into the equipment at a flow rate of 40 L/h. The above prepared intermediate product after 1$^{st}$ sintering is labelled NMC cE1p, and the final NMC sample after 2$^{nd}$ sintering is labelled NMC cE1. FIG. 5 shows the XRD patterns of NMC cE1p and NMC cE1. The Bragg peaks (003), (101), (104) and doublet peak (006, 102) are clearly visible. Based on the intensity of these peaks, Table 6 summarizes the ratio of I003/I104 and R factor of the NMC cE1p and NMC cE1 samples.

TABLE 6

I003/I104 ratio and R factor of Comparative Example 1

| Sample | I003/I104 | R factor |
|---|---|---|
| NMC cE1p | 0.81 | 0.66 |
| NMC cE1 | 1.00 | 0.41 |

Looking at the ratio I003/I104, it can be concluded that there is more cation mixing in NMC cE1p and more Ni on the Li sites. The same observation can be made when comparing the R factor. The higher value of R in NMC cE1p confirms that there is a higher percentage of Ni on Li sites in the intermediate product. Table 7 summarizes the electrochemical performance and soluble base content of NMC cE1. The coin cell test is conducted at the charge cutoff voltage of 4.5V/Li metal and a 1 C current definition of 160 mA/g.

TABLE 7

Performance of Comparative Example 1

| Sample | DQ0.1 C (mAh/g) | 0.1 C QFad. (%/100) | 1 C QFad. (%/100) | $Li_2CO_3$ (wt %) |
|---|---|---|---|---|
| NMC cE1 | 176.7 | 0.2 | 5.4 | 0.196 |

The NMC cE1 sample shows less weight percentage of lithium carbonate than NMC P1.1, P1.2, and P1.3. It shows that there is 0.002% loss of discharge capacity per cycle at 0.1 C after 25 cycles and 0.054% loss for 1 C. Therefore, the double sintering method using the roasted transition metal source enhances the cycle properties of the NMC product.

Comparative Example 2: NMC Samples Prepared Using the Intermediate Product with Low Li/M' Atomic Ratio An NMC powder having the formula $Li_{1.017}M'_{0.983}O_2$ with $M'=Ni_{0.4}(Ni_{0.5}Mn_{0.5})_{0.4}Co_{0.2}$ is obtained according to the steps in Comparative Example 1 (including the pre-roasting step), except that the intermediate product has a Li/M' atomic ratio of 0.718. In the 1$^{st}$ sintering step, the mixture of transition metal source and $LiOH.H_2O$ is sintered at 820° C. for 2 hours of residence time and 0.628 rpm of rotation speed under dry air with flow rate of 1.67 m$^3$/kg in a rotary furnace. The 2$^{nd}$ sintering is conducted at 855° C. for 10 hours under dry air atmosphere in a tray based furnace. The dry air is continuously pumped into the equipment at a flow rate of 40 L/h. The above prepared intermediate product after the 1$^{st}$ sintering is labelled NMC cE2p, and the final NMC sample after the 2$^{nd}$ sintering is labelled NMC cE2.

Comparative Example 3: NMC Samples Prepared Using the Intermediate Product with Low Li/M' Atomic Ratio at Low Temperature An NMC powder with formula $Li_{1.017}M'_{0.983}O_2$ with $M'=Ni_{0.4}(Ni_{0.5}Mn_{0.5})_{0.4}Co_{0.2}$ is prepared according to the steps in Comparative Example 1 (including the pre-roasting step), except that the lithium deficient sintered precursor has a ratio of Li/M':=0.723, as it is prepared at a low 1$^{st}$ sintering temperature of 720° C. In the 1$^{st}$ sintering step, the mixture of transition metal source and $LiOH.H_2O$ is sintered at 720° C. for 2 hours of residence time and 0.628 rpm of rotation speed under dry air with flow rate of 1.67 m$^3$/kg in a rotary furnace. The 2$^{nd}$ sintering is conducted at 845° C. for 10 hours under dry air atmosphere in a tray based furnace. The dry air is continuously pumped into the equipment at a flow rate of 40 L/hr. The above prepared intermediate product after 1$^{st}$ sintering is labelled NMC cE3p, and the final NMC sample after 2$^{nd}$ sintering is labelled NMC cE3.

Figure 6:
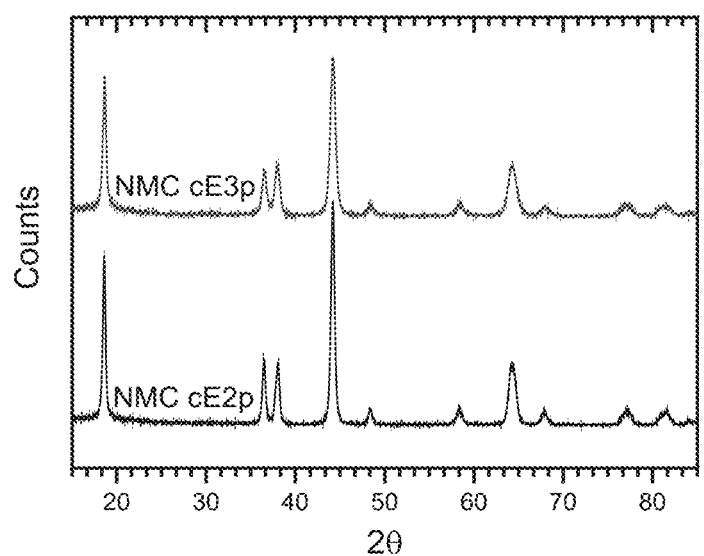
FIG. 6: XRD patterns of intermediate product with low Li/M' atomic ratio of NMC samples
Figure 7:
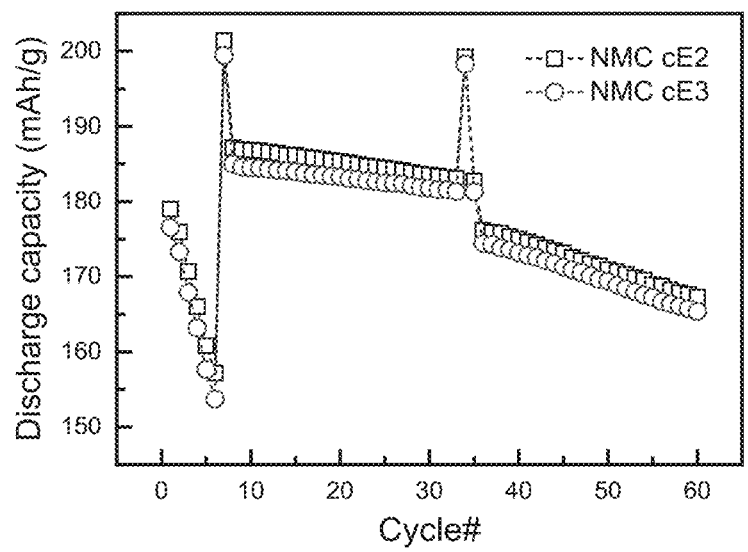
FIG. 7: Coin cell profile of NMC samples prepared using the intermediate product with low Li/M' atomic ratio

FIG. 6 shows the X-ray diffraction patterns of NMC cE2p and NMC cE3p, where the intermediate means the intermediate powder obtained after the 1$^{st}$ sintering. The XRD patterns disclose single-phase NMC powders without obvious impurities. In the Figure, the (003) and (104) diffraction peaks are used to calculate the crystalline size L and lattice strain with the W-H method. FIG. 7 shows the coin cell results of the NMC cE2 and NMC cE3 samples, where the square symbol is for NMC cE2 and the circle symbol is for NMC cE3. It can be observed that the NMC cE3 has a similar but slightly better cycling stability than NMC cE2, and Table 8 summarizes the electrochemical performance and soluble base content of NMC cE2 and NMC cE3. The coin cell test is conducted at the charge cutoff voltage of 4.5V/Li metal and a 1 C current definition of 160 mA/g.

TABLE 8

Performance of Comparative Example 2 and Comparative Example 3

| Sample | *Size (nm) by W-H | DQ0.1 C (mAh/g) | 0.1 C QFad. (%/100) | 1 C QFad. (%/100) | $Li_2CO_3$ (wt %) |
|---|---|---|---|---|---|
| NMC cE2 | 33.8 | 179.0 | 4.0 | 8.7 | 0.245 |
| NMC cE3 | 31.1 | 176.5 | 2.2 | 7.4 | 0.256 |

*The crystalline size L of the intermediate products.

These samples were made using the same double firing method, the only difference being the different sintering temperature conditions in the 1$^{st}$ sintering, which results in a different crystalline size and lattice strain of the intermediate precursor. When fabricated at a low 1$^{st}$ sintering temperature of 820° C., NMC cE2 has a crystalline size of 33.8 nm. When the sintering temperature goes down by 100° C., the crystalline size of NMC cE3 is 31.1 nm.

Example 2: NMC Samples Prepared Using a High Tray Load During the 2$^{Nd}$ Sintering An NMC powder with formula $Li_{1.017}M'_{0.983}O_2$ with $NM'=Ni_{0.4}(Ni_{0.5}Mn_{0.5})_{0.4}Co_{0.2}$ is prepared using the steps of Example 1, except that the intermediate product has a Li/M' atomic ratio of 0.93, and is prepared with a high tray load of 7 kg during the 2$^{nd}$ sintering. The amount of blend on the tray is twice as much as the Example 1, where it was 3.5 kg. Table 9 summarizes the electrochemical performance and soluble base content of NMC E2. The coin cell test is conducted at the charge cutoff voltage of 4.5V/Li metal and a 1 C current definition of 160 mA/g.

TABLE 9

Performance of Example 2

| Sample | DQ0.1 C (mAh/g) | 0.1 C QFad. (%/100) | 1 C QFad. (%/100) | $Li_2CO_3$ (wt %) |
|---|---|---|---|---|
| NMC E2 | 174.8 | −0.3 | 4.1 | 0.315 |

The NMC E2 sample shows a higher weight percentage of lithium carbonate than other NMC samples because the NMC material is prepared with a high tray load. Nevertheless, it exhibits good electrochemical performances, as it does not show a loss of discharge capacity per cycle at 0.1 C after 25 cycles, and 0.041% loss for 1 C. Therefore, by using the double firing method according to the invention, it is possible to obtain a nickel-excess NMC powder having good cycling stability even in large-scale manufacturing.

Example 3: Al Coated NMC Samples

An Al coated NMC sample NMC E3 is obtained using the steps in Example 1 and "Surface Coating Example 1". After blending with a nanometric alumina powder (2 g alumina per kg NMC), homogeneous blending, and sintering at 750° C. (the dwell time being around 5 hours), NMC powder is surrounded by an Al layer on the surface.

Example 4: Al/F Coated NMC Samples

An Al/F coated NMC sample NMC E4 is obtained using the steps in Example 1 and "Surface Coating Example 2": 1 kg of NMC powder is filled into a mixer, 2 g of alumina ($Al_2O_3$) powder and 3 g polyvinylidene fluoride (PVDF) powder is added as well. After homogeneously mixing (usually 30 minutes at 1000 rpm), the mixture is sintered in a box furnace in an oxidizing atmosphere. The sintering temperature is 375° C. and the dwell time is 5 hours. As a result, the NMC powder has an Al/F layer on the surface.

Figure 8:
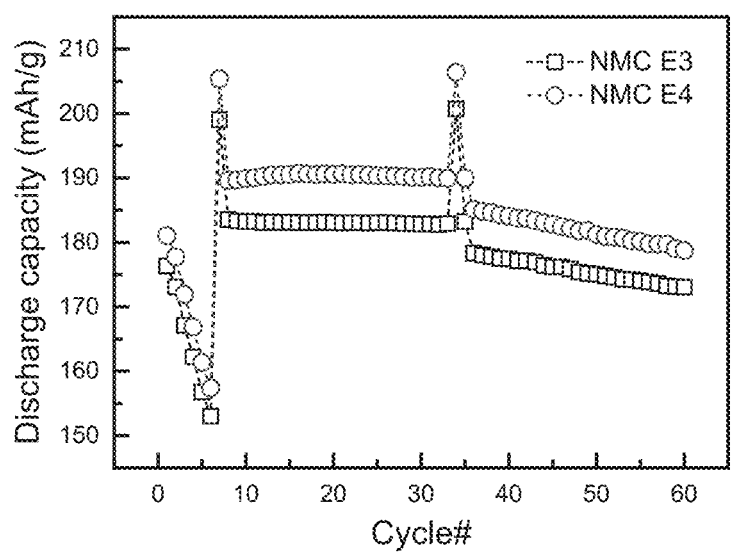
FIG. 8: Coin cell profile of Al and Al/F coated NMC samples

FIG. 8 shows the coin cell results of the NMC E3 and NMC E4 samples, where the square symbol is for NMC E3 and the circle symbol is for NMC E4. The cycling stability of NMC E6 is excellent, and from the Figure, it can be observed that the NMC E4 has an even better discharge capacity and cycling stability than NMC E3. Moreover, the NMC E4 has a low lithium carbonate content of 0.104 wt % while the content in the NMC cE1 is 0.196 wt %. Therefore, the Al/F layer reduces the amount of soluble base in the final product and stabilizes the surface against unwanted side reactions between the NMC surface and electrolytes, which results in enhanced cycling performance.

Comparative Example 4: Al Coated NMC Samples Prepared Using Roasted Transition Metal Source An Al coated NMC sample NMC cE4 is obtained using the steps in Comparative Example 1 and "Surface Coating Example 1" (as in Example 6). After blending with aluminum source and sintering, NMC powder is surrounding by Al layer on the surface.

Comparative Example 5: Al/F Coated NMC Samples Prepared Using Roasted Transition Metal Source An Al coated NMC sample NMC cE5 is obtained from the Comparative Example 2 and "Surface Coating Example 2" (as in Example 7). After blending with the aluminum source and fluorine-containing polymer and subsequent sintering, NMC powder has an Al/F layer on the surface.

Figure 9:
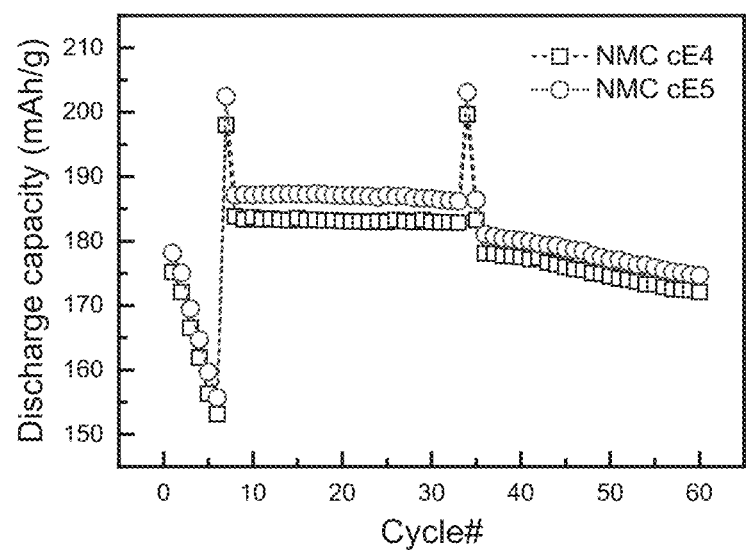
FIG. 9: Coin cell profile of Al and Al/F coated NMC samples prepared using roasted transition metal source

FIG. 9 shows the coin cell results of the NMC cE4 and NMC cE5 samples, where the square symbol is for NMC cE4 and the circle symbol is for NMC cE5. The coin cell test is conducted at the charge cutoff voltage of 4.5V/Li metal and a 1 C current definition of 160 mA/g. The cycling stability of NMC cE5 is excellent, and from the Figure, it can be observed that the NMC cE5 has an even better cycling stability than NMC cE2. The NMC product prepared by the pre-roasted transition metal source further shows a reduced content of soluble base in the final NMC product by Al/F layer and improved stability between the NMC surface and the electrolyte. Accordingly, it shows an enhanced cycling performance.

Figure 10:
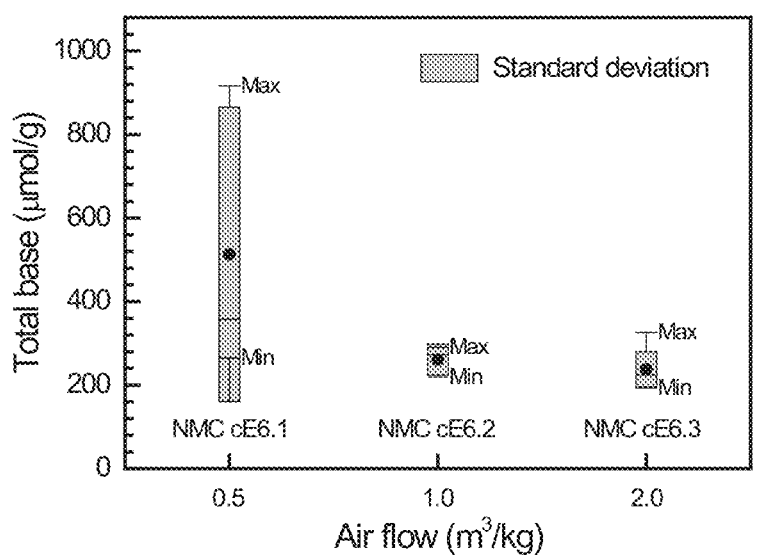
FIG. 10: Total base content of NMC samples prepared using various air flow conditions during the $1^{st}$ sintering

Comparative Example 6: NMC Samples Prepared Using Various Air Flow Conditions During the 1$^{st}$ Sintering An NMC powder with formula $Li_{1.017}M'_{0.983}O_2$ with $M'=Ni_{0.4}(Ni_{0.5}Mn_{0.0})_{0.4}Co_{0.2}$ is prepared using the steps in Comparative Example 1. In this example, in the rotary furnace for the 1$^{st}$ sintering, an air flow condition is set in the range from 0.5 m$^3$/kg to 2.0 m$^3$/kg. In case of 0.5 m$^3$/kg air flow, the sample is labelled NMC E6.1. When the air flow is 1.0 m$^3$/kg and 2.0 m$^3$/kg, the samples are labelled as NMC E6.2 & NMC E6.3 respectively. FIG. 10 shows the total base content in the final NMC products. As shown in the figure, when the air flow during the first sintering is 0.5 m$^3$/kg, there is a large variation of total base amount, which can be attributed to the low air flow that seems not enough to evacuate the produced $CO_2$ gas completely, and results in larger amounts of lithium carbonate in the final product. When the air flow is 1.0 m$^3$/kg and 2.0 m$^3$/kg, it has a better variation of total base. Therefore, in order to minimize the formation of soluble base, it is preferred to use an air flow of 1.0 m$^3$/kg or more.

Figure 11:
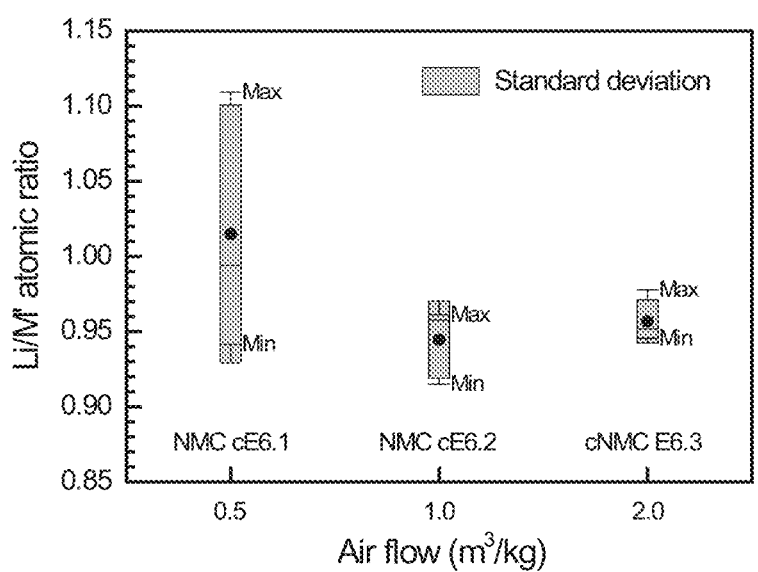
FIG. 11: Li/M' atomic ratio of NMC samples prepared using various air flow conditions during the $1^{st}$ sintering

FIG. 11 indicates the Li/M' atomic ratio in various samples of the product after the 1$^{st}$ sintering. In case of a slow air flow such as 0.5 m$^3$/kg, the incomplete removal of $CO_2$ gas during the preparation causes an inhomogeneous composition. When the air flow is 1.0 m$^3$/kg or more, a better variation of Li/M' atomic ratio is achieved. NMC cE6.3 exhibits the best variation of Li/M' atomic ratio after 1$^{st}$ sintering. Therefore, to produce a high quality of NMC, an air flow of 2.0 m$^3$/kg is even better.

Example 5: Al/Sulfate Coated NMC Sample

An NMC powder with formula $Li_{1.017}M'_{0.983}O_2$ with $M'=Ni_{0.4}(Ni_{0.5}Mn_{0.50})_{0.35}Co_{0.20}$ is prepared using the steps of Example 1, except that a mixed nickel-manganese-cobalt oxyhydroxide ($M'O_{0.39}(OH)_{1.61}$, where $M'=Ni_{0.625}Mn_{0.175}Co_{0.200}$) is used as a precursor (M1) and the lithium deficient sintered precursor has a Li/M' atomic ratio of 0.883. In the 1$^{st}$ sintering step, the mixture of transition metal source and LiOH.H$_2$O is sintered at 820° C. in a rotary furnace for 2 hours (residence time) and 0.628 rpm of rotation speed, under dry air with a flow rate of 1.67 m$^3$/kg. The crystalline size of the lithium deficient sintered precursor after the 1$^{st}$ sintering is 26.2 nm. The 2$^{nd}$ sintering is conducted at 845° C. for 10 hours under a dry air atmosphere in a tray based furnace. The dry air is continuously pumped into the equipment at a flow rate of 40 L/h. The sintered NMC product is labeled NMC E5.1.

The NMC product after the 2$^{nd}$ sintering is blended with coating sources using the steps of "Surface Coating Example 3". First, the NMC powder is blended with 1.2 wt % of sodium persulfate ($Na_2S_2O_8$) and 0.2 wt % aluminum oxide ($Al_2O_3$). The blend is heated at 375° C. for 5 hours under air. The final product carries a coating comprising $LiNaSO_4$ and $Al_2O_3$, and is named NMC E5.2. Table 10 summarizes the electrochemical performance and soluble base content of NMC E5.1 and E5.2. The coin cell test is conducted at the charge cutoff voltage of 4.5V/Li metal and a 1 C current definition of 160 mA/g.

TABLE 10

Performance of Example 5

| Sample | DQ0.1 C (mAh/g) | 0.1 C QFad. (%/100) | 1 C QFad. (%/100) | $Li_2CO_3$ (wt %) |
|---|---|---|---|---|
| NMC E5.1 | 180.6 | −1.04 | 3.41 | 0.301 |
| NMC E5.2 | 184.6 | 0.88 | 1.44 | 0.143 |

These examples have a high discharge capacity because of the high Ni-excess of 0.45. The Al/Sulfur coating on the NMC sample reduces the soluble base content and shows improved battery properties, such as higher discharge capacity and cycling stability.

Other compositions of the crystalline precursor with a Ni-excess (z) of 0.410 and 0.700 also have good electrochemical performance. Especially, the crystalline precursor having the range of 'a' from 0 to 0.053 in the formula $Li_{1-a}((Ni_z(Ni_{0.5}Mn_{0.5})_yCo_x)_{1-k}A_k)_{1+a}O_2$ and the Ni-excess range from 0.25 to 0.85 obtains the $Li_2CO_3$ content less than 0.4 wt %, which lead to low soluble base content of the final NMC powder. Accordingly, the NMC powder has higher discharge capacity and low capacity fading. Table 11 shows the summarized properties of Examples, which are according to the present invention.

TABLE 11

Summary of Examples

| | | 1$^{st}$ firing temperature (° C.) | Intermediate product, $Li_{1-a}((Ni_z(Ni_{0.5}Mn_{0.5})_yCo_x)_{1-k}A_k)_{1+a}O_2$ | | | | | | NMC product, $Li_{1-a'}((Ni_z(Ni_{0.5}Mn_{0.5})_yCo_x)_{1-k}A_k)_{1+a'}O_2$ | | | |
|---|---|---|---|---|---|---|---|---|---|---|---|---|
| Sample | Type | | a | Ni-excess z | Co x | A k | Crystalline size L (nm) | $Li_2CO_3$ (wt %) | Sample | a' | $Li_2CO_3$ (wt %) | DQ0.1C (mAh/g) | 1C QFad. (%/100)) |
| Claim | — | — | 0-0.053 | 0.25-085 | 0.05-0.40 | 0-0.1 | 15-36 | <0.4 | — | −0.10-0 | — | — | |
| NMC E1p | Poly* | 820 | 0.041 | 0.400 | 0.200 | 0.000 | 27.8 | 0.19 | NMC E1 | −0.017 | 0.206 | 179.5 | 5.4 |
| NMC cE1p | Poly* | 820 | 0.061 | 0.400 | 0.200 | 0.000 | 35.4 | 0.14 | NMC cE1 | −0.017 | 0.196 | 176.7 | 5.4 |
| NMC cE2p | Poly* | 820 | 0.164 | 0.400 | 0.200 | 0.000 | 33.8 | 0.17 | NMC cE2 | −0.017 | 0.245 | 179.0 | 8.7 |
| NMC cE3p | Poly* | 720 | 0.161 | 0.400 | 0.200 | 0.000 | 31.1 | 0.25 | NMC cE3 | −0.017 | 0.256 | 176.5 | 7.4 |
| NMC E2p | Poly* | 820 | 0.036 | 0.400 | 0.200 | 0.000 | 26.2 | 0.21 | NMC E2 | −0.017 | 0.315 | 174,8 | 4.1 |
| NMC E6p | Mono** | 770 | 0.047 | 0.410 | 0.150 | 0.000 | 34.5 | 0.28 | NMC E6 | −0.021 | 0.099 | 176.8 | 9.0 |
| NMC E7p | Poly* | 750 | 0.005 | 0.700 | 0.100 | 0.000 | 33.1 | 0.29 | NMC E7 | −0.003 | — | 192.6 | 4.0 |

*Poly: Polycrystalline structure
**Mono: Monolithic structure

The Li/M' atomic ratio is equivalent to the 'a' value. In the intermediate product having the general formula: $Li_{1-a}M'_{1+a}O_2$, the Li/M' ratio equals '(1−a)/(1+a)'. For example, if 'a' is 0.041 such as for NMC E1p, then the Li/M' ratio is '(1−0.041)/(1+0.041)=0.921'. Therefore, in the present invention, the intermediate product has a Li/M' ratio from about 0.9+/−0.05 to 1.0+/−0.05 according to the claimed range of 'a'. As shown in Table 11, when 'a' of the intermediate product is in the range defined from 0 to 0.053, it leads to a discharge capacity higher than or equal to 174.8 mAh/g and a 1 C QFad. less than or equal to 5.4%, when converted into the NMC cathode material according to process described in the present invention. For example, NMC E1p has the discharge capacity of 179.5 mAh/g and 1 C QFad. of 5.4%.

The technical effects of NMC E12p and NMC E13p are further described as follows.

Example 6: NMC Sample with a Ni-Excess of 0.41

A crystalline precursor, having the formula $Li_{0.953}(Ni_{0.41}(Ni_{0.5}Mn_{0.5})_{0.4}Co_{0.15})_{1.047}O_2$ are prepared through a firing process which is a solid-state reaction between a lithium source and a transition metal-based source running as follows:

1) Co-precipitation: a transition metal-based hydroxide precursor $M'O_{0.27}(OH)_{1.73}$ (MTH1) with metal composition $M'=Ni_{0.4}(Ni_{0.5}Mn_{0.5})_{0.40}Co_{0.15}$ is prepared by a co-precipitation process in a large-scale continuous stirred tank reactor (CSTR) with mixed nickel-manganese-cobalt sulfates, sodium hydroxide, and ammonia.

2) Heating: MTH1 is heated at 375° C. for 12 hours under dry air atmosphere so as to prepare a transition metal-based oxide (MTO1).

3) 1$^{st}$ firing: MTO1 and LiOH as a lithium source are homogenously mixed so as to prepare a 1$^{st}$ mixture having a Li/M' atomic ratio of 0.91.

4) 1$^{st}$ firing: the 1$^{st}$ mixture is fired at 770° C. for 1 hour under dry air atmosphere so as to prepare NMC E6p.

NC E6p is according to the present invention.

To confirm the electrochemical performance of the NMC powder as a positive electrode active material, the monolithic NMC powder is obtained using the above crystalline precursor (NMC E6p) by the following procedure:

1) 2$^{nd}$ mixing: NMC E6p and LiOH.H$_2$O as a lithium source are homogenously mixed so as to prepare a 2$^{nd}$ mixture having a Li/M' atomic ratio of 1.043.

2) 2$^{nd}$ firing: the 2$^{nd}$ mixture is fired at 890° C. for 10 hours under dry air atmosphere so as to prepare a fired agglomerated powder.

3) Milling: the fired agglomerated powder is crushed. 50 g of the crushed powder is put in a 250 mL vessel with 50 mL deionized water, 10 mm ZrO$_2$ balls with a filling ratio of 25% of the volume of the vessel and 0.5 at % $Co_3SO_4$ with respect to the total atomic ratio of Ni, Mn, and Co in NMC E12p. The vessel is rotated on a commercial ball mill equipment for 15 hours with a milling speed of 20 cm/s.

4) Filtering and drying: the wet milled solid powder is separated from water by using a filter. The filtered wet milled NMC powder is dried at 80° C. in an oven with dry air to obtain the monolithic NMC powder.

5) 3$^{rd}$ mixing and 3$^{rd}$ firing: the dried monolithic NMC powder is mixed with Al$_2$O$_3$, Co$_3$O$_4$, and LiOH. The amount of Co$_3$O$_4$ and LiOH is 2 at % and 3 at % with respect to the total atomic ratio of Ni, Mn, and Co in the dried monolithic NMC powder, respectively. Al content is also 500 ppm with respect to the total weight of the dried monolithic NMC powder. The $3^{rd}$ mixture is fired at 775° C. for 10 hours under dry air atmosphere so as to prepare a $2^{nd}$ agglomerated powder.

6) Post treatment: the $2^{nd}$ agglomerated powder is crushed, classified, and sieved so as to obtain NMC powder having a formula $Li_{0.024}M'_{0.976}O_2$ (a=−0.024) with $M'=Ni_{0.403}(Ni_{0.5}Mn_{0.5})_{0.430}Co_{0.167}$ and labelled NMC E6.

The crystallite size of NMC E6p is investigated as described in section D) XRD test. $Li_2CO_3$ contents of NMC E6p and NMC E6 are investigated as described in section A) pH titration test. NMC E6 is also evaluate as described in section E) Coin cell test. Wherein the coin cell test is conducted at the charge cutoff voltage of 4.5 V/Li metal and a 1 C current definition of 160 mA/g. Analysis results are shown in Table 12 and Table 13.

TABLE 12

Properties of Example 6

| Example ID | Li/M' atomic ratio | $1^{st}$ firing temperature (° C.) | Crystallite size L (nm) | $Li_2CO_3$ (wt %) |
|---|---|---|---|---|
| NMC E6p | 0.91 | 770 | 34.5 | 0.279 |

TABLE 13

Performance of Example 12

| NMC ID | Type | Crystalline precursor | $Li_2CO_3$ (wt %) | DQ0.1 C (mAh/g) | 1 C QFad. (%/100)) |
|---|---|---|---|---|---|
| NMC E6 | Mono* | EX3 | 0.099 | 176.8 | 9.0 |

*Mono: Monolithic structure

The crystalline precursor (NMC E6p) has a crystallite size of 34.5 nm and a $Li_2CO_3$ content of 0.279 wt %. NMC E6, prepared using the crystalline precursor according to the invention, has good electrochemical performance.

Example 7: NMC Sample with a Ni-Excess of 0.70

A crystalline precursor, having the formula $Li_{0.889}(Ni_{0.70}(Ni_{0.5}Mn_{0.5})_{0.2}Co_{0.10})_{1.111}O_2$ are prepared through a firing process which is a solid-state reaction between a lithium source and a transition metal-based source running as follows:

1) Co-precipitation: a transition metal-based hydroxide precursor $M'O_{0.24}(OH)_{1.76}$ (MTH2) with metal composition $M'=Ni_{0.70}(Ni_{0.5}Mn_{0.5})_{0.20}Co_{0.12}$ is prepared by a co-precipitation process in a large-scale continuous stirred tank reactor (CSTR) with mixed nickel-manganese-cobalt sulfates, sodium hydroxide, and ammonia.
2) Heating: MTH2 is heated at 400° C. for 11.75 hours under dry air and labelled MTO2.
3) $1^{st}$ mixing: MTO2 and LiOH as a lithium source are homogenously mixed so as to prepared a $1^{st}$ mixture having a Li/M' atomic ratio of 0.99.
4) $1^{st}$ firing: the $1^{st}$ mixture is fired at 730° C. for 2 hours under dry air atmosphere so as to prepare NMC E7p. NMC E7p is according to the present invention.

To confirm the electrochemical performance of the NMC powder as a positive electrode active material, the polycrystalline NMC powder is obtained using the above crystalline precursor (NMC E7p) by the following procedure:

1) $2^{nd}$ mixing: NMC E7p and LiOH as a lithium source are homogenously mixed so as to prepare a $2^{nd}$ mixture having a Li/M' atomic ratio of 1.007.

2) $2^{nd}$ firing: the $2^{nd}$ mixture is fired at 830° C. for 12 hours under oxygen-containing atmosphere so as to prepare a fired agglomerated powder.

3) Post treatment: the fired agglomerated powder is crushed, classified, and sieved so as to obtain the NMC powder having a formula $Li_{1.003}M'_{0.997}O_2$ (a=−0.003) with $M'=Ni_{0.8}(Ni_{0.5}Mn_{0.5})_{0.2}Co_{0.1}$ and labelled NMC E7.1.

Surface treated NMC powder is prepared according to the following procedure. NMC E7.1 is mixed with an aluminum sulfate solution which is prepared using $Al_2(SO_4)_3.16H_2O$ and deionized water. The amount of Al is 1000 ppm with respect to the total weight of NMC E7.1. The mixture is fired at 375° C. for 8 hours under an oxygen atmosphere. The fired powder is crushed, classified, and sieved so as to obtain NMC E7.2.

The crystallite size of NMC E7p is investigated as described in section D) XRD test. $Li_2CO_3$ contents of NMC E7p, NMC E7.1, and NMC E7.2 are investigated as described in section A) pH titration test. NMC E7.1 and NMC E7.2 are also evaluate as described in section E) Coin cell test. The coin cell test is conducted at the charge cutoff voltage of 4.3V/Li metal and a 1 C current definition of 220 mA/g. The analysis results are shown in Table 14 and Table 15.

TABLE 14

Properties of Example 7

| Example ID | Li/M' atomic ratio | $1^{st}$ firing Temperature (° C.) | Crystallite size L (nm) | $Li_2CO_3$ (wt %) |
|---|---|---|---|---|
| NMC E7p | 0.99 | 750 | 33.1 | 0.289 |

TABLE 15

Performance of Example 7

| NMC ID | Type | $Li_2CO_3$ (wt %) | DQ0.1 C (mAh/g) | 1 C QFad. (%/100)) |
|---|---|---|---|---|
| NMC E7.1 | Poly* | — | 198.6 | 4.0 |
| NMC E7.2 | Poly* | 0.145 | 202.3 | 4.0 |

*Poly: Polycrystalline structure

The crystalline precursor (NMC E7p) has a crystallite size of 33.1 nm and a $Li_2CO_3$ content of 0.289 wt %. NMC E7.1 prepared using the crystalline precursor according to the invention, has good electrochemical performance such as high discharge capacity. The surface treated NMC powder, NMC E7.2, has a higher discharge capacity.

The invention is further covered by the following clauses:
1. A crystalline precursor compound for manufacturing a lithium transition metal based oxide powder usable as an active positive electrode material in lithium-ion batteries, the precursor having a general formula $Li_{1−a}((Ni_z(Ni_{0.5}Mn_{0.5})_yCo_x)_{1−k}A_k)_{1+a}O_2$, wherein A comprises at least one element of the group consisting of: Mg, Al, Ca, Si, B, W, Zr, Ti, Nb, Ba, and Sr, with $0.05 \leq x \leq 0.40$, $0.25 \leq z \leq 0.85$, $x+y+z=1$, $0 \leq k \leq 0.10$, and $0 \leq a \leq 0.053$, wherein said crystalline precursor powder has a crystalline size L, expressed in nm, with $15 \leq L \leq 36$.
2. The crystalline precursor compound of clauses 1, having a $Li_2CO_3$ content of inferior to 0.4 wt %.
3. The crystalline precursor compound of clauses 1, wherein $0.03 \leq a \leq 0.053$.

4. The crystalline precursor compound of clauses 1, wherein $0.35 \leq z \leq 0.50$ 5. The crystalline precursor compound of clauses 1, wherein the precursor has an integrated intensity ratio I003/I104<1, wherein I003 and I104 are the peak intensities of the Bragg peaks (003) and (104) of the XRD pattern of the crystalline precursor compound.

6. The crystalline precursor compound of clauses 1, wherein the precursor has an integrated intensity ratio I003/I104<09.

7. The crystalline precursor compound of clauses 1, wherein the precursor has a ratio R of the intensities of the combined Bragg peak (006, 102) and the Bragg peak (101) with R=((I006+I102)/I101) and 0.5<R<1.16.

8. The crystalline precursor compound of clauses 1, wherein the precursor has a crystalline size L expressed in nm, with $25 \leq L \leq 36$.

9. A method for preparing a positive electrode material having the general formula $Li_{1-a}M'_{1+a}O_2$, with $M'=(Ni_z(Ni_{0.5}Mn_{0.5})_yCo_x)_{1-k}A_k$, wherein x+y+z=1, $0.05 \leq x \leq 0.40$, $0.25 \leq z \leq 0.85$, A is a dopant, $0 \leq k \leq 0.1$, and $-0.10 \leq a' \leq 0$, the method comprising the steps of:
  providing a M'-based precursor prepared from the co-precipitation of metal salts with a base;
  mixing the M'-based precursor with either one of LiOH, $Li_2O$ and $LiOH.H_2O$, thereby obtaining a first mixture, whereby the Li to transition metal ratio in the first mixture is between 0.90 and 1.00,
  sintering the first mixture in an oxidizing atmosphere in a rotary kiln at a temperature between 650 and 850° C., for a time between ⅓ hour and 3 hours, thereby obtaining a lithium deficient precursor powder according to any one of claims 1 to 7,
  mixing the lithium deficient precursor powder with either one of LiOH, $Li_2O$ and $LiOH.H_2O$, thereby obtaining a second mixture, and
  sintering the second mixture in an oxidizing atmosphere at a temperature between 800 and 1000° C., for a time between 6 hours and 36 hours.

10. A method for preparing a positive electrode material comprising a core material having the general formula $Li_{1-a}M'_{1+a}O_2$, with $M'=(Ni_z(Ni_{0.5}Mn_{0.5})_yCo_x)_{1-k}A_k$, wherein x+y+z=1, $0.05 \leq x \leq 0.40$, $0.25 \leq z \leq 0.85$, A is a dopant, $0 \leq k \leq 50.1$, and $-0.10 \leq a' \leq 0$, and a coating comprising a metal M", the method comprising the steps of claim 8 for obtaining the core material, and additionally the steps of either:
  A1) providing a third mixture comprising the core material and a compound comprising M", and
  A2) heating the third mixture to a sintering temperature between 600° C. and 800° C.; or
  B1) providing a fourth mixture comprising the core material, a fluorine-containing polymer and a compound comprising M", and
  B2) heating the fourth mixture to a sintering temperature between 250 and 500° C., or
  C1) providing a fifth mixture comprising the core material, an inorganic oxidizing chemical compound, and a chemical that is a Li-acceptor, and
  C2) heating the fifth mixture at a temperature between 300 and 800° C. in an oxygen comprising atmosphere.

11. The method according to clauses 10, wherein the compound comprising M" in either one of steps A1) and B1) is either one or more of an oxide, a sulfate, a hydroxide and a carbonate, and M" is either one or more of the elements Al, Ca, Ti, Mg, W, Zr, B, Nb and Si.

12. The method according to clauses 11, wherein the compound comprising M" is a nanometric alumina powder having a D50 of inferior to 100 nm and a surface area of at least 50 $m^2$/g.

13. The method according to clauses 10, wherein the fluorine-containing polymer in step B1) is either one of a PVDF homopolymer, a PVDF copolymer, a PVDF-HFP polymer (hexa-fluoro propylene) and a PTFE polymer, and wherein the amount of fluorine-containing polymer in the fourth mixture is between 0.1 wt % and 2 wt %.

14. The method according to clauses 9, wherein through the rotary kiln an air flow is applied between 0.5 $m^3$/kg and 3.5 $m^3$/kg.

15. The method according to clauses 9, wherein the step of sintering the second mixture is performed in a tray conveyor furnace wherein each tray carries at least 5 kg of mixture.

16. The method according to clauses 9, wherein between the step of providing a M'-based precursor and the step of mixing the M'-based precursor with either one of LiOH, $Li_2$ and $LiOH.H_2O$ the M'-based precursor is subjected to a roasting step at a temperature above 200° C. in a protective atmosphere, such as under $N_2$.

17. The method according to clauses 16, wherein the transition metals in the M'-based precursor have a mean oxidation state of superior to 2.5 and wherein the precursor has a content of $H_2O$ of inferior to 15 wt %.

18. The method according to clauses 16, wherein the transition metals in the M'-based precursor have a mean oxidation state of superior to 2.7 and wherein the precursor has a content of $H_2O$ of inferior to 5 wt %.

19. The method according to clauses 10 comprising steps C1) and C2), wherein M"=Li, and in step C1) the inorganic oxidizing chemical compound is $NaHSO_5$, or either one of a chloride, a chlorate, a perchlorate and a hypochloride of either one of potassium, sodium, lithium, magnesium and calcium, and the Li-acceptor chemical is either one of $AlPO_4$, $Li_3AlF_6$ and $AlF_3$.

20. The method according to clauses 10 comprising steps C1) and C2), wherein M"=Li, and in step C1) both the inorganic oxidizing chemical compound and the Li-acceptor chemical are the same compound, being either one of $Li_2S_2O_8$, $H_2S_2O_8$ and $Na_2S_2O_8$.

21. The method according to clauses 10 comprising steps C1) and C2), wherein in step C1) a nanosized $Al_2O_3$ powder is provided as a further Li-acceptor chemical.

The invention claimed is:

1. A method for preparing a positive electrode material having the general formula $Li_{1-a}M'_{1+a}O_2$, with $M'=(Ni_z(Ni_{0.5}Mn_{0.5})_yCo_x)_{1-k}A_k$, wherein x+y+z=1, $0.05 \leq x \leq 0.40$, $0.25 \leq z \leq 0.85$, A is a dopant, $0 \leq k \leq 0.1$, and $-0.10 \leq a' \leq 0$, the method comprising the steps of:
  providing a M'-based precursor prepared from the co-precipitation of metal salt with a base;
  mixing the M'-based precursor with either one of LiOH, $Li_2O$ and $LiOH.H_2O$, thereby obtaining a first mixture, whereby the Li to transition metal ratio in the first mixture is between 0.90 and 1.00,
  sintering the first mixture in an oxidizing atmosphere in a rotary kiln at a temperature between 650 and 850° C., for a time between ⅓ hour and 3 hours, thereby obtaining a lithium deficient precursor powder, the lithium deficient precursor powder having a general formula $Li_{1-a}((Ni_z(Ni_{0.5}Mn_{0.5})_yCo_x)_{1-k}A_k)_{1+a}O_2$, wherein A comprises at least one element of the group consisting of: Mg, Al, Ca, Si, B, W, Zr, Ti, Nb, Ba, and Sr, with $0.05 \leq x \leq 0.40$, $0.25 \leq z \leq 0.85$, x+y+z=1, $0 \leq k \leq 0.10$, and $0 \leq a \leq 0.053$, wherein said crystalline precursor powder has a crystalline size L, expressed in nm, with $15 \leq L \leq 36$, mixing the lithium deficient precursor powder with either one of LiOH, $Li_2O$ and $LiOH \cdot H_2O$, thereby obtaining a second mixture, and sintering the second mixture in an oxidizing atmosphere at a temperature between 800 and 1000° C., for a time between 6 hours and 36 hours.

2. A method for preparing a positive electrode material comprising a core material having the general formula $Li_{1-a}M'_{1+a}O_2$, with $M'=(Ni_z(Ni_{0.5}Mn_{0.5})_yCo_x)_{1-k}A_k$, wherein $x+y+z=1$, $0.05 \leq x \leq 0.40$, $0.25 \leq z \leq 0.85$, A is a dopant, $0 \leq k \leq 0.1$, and $-0.10 \leq a' \leq 0$, and a coating comprising a metal M", the method comprising the steps of claim 1 for obtaining the core material, and additionally the steps of either:

A1) providing a third mixture comprising the core material and a compound comprising M", and A2) heating the third mixture to a sintering temperature between 600° C. and 800° C.; or B1) providing a fourth mixture comprising the core material, a fluorine-containing polymer and a compound comprising M", and B2) heating the fourth mixture to a sintering temperature between 250 and 500° C., or C1) providing a fifth mixture comprising the core material, an inorganic oxidizing chemical compound, and a chemical that is a Li-acceptor, and C2) heating the fifth mixture at a temperature between 300 and 800° C. in an oxygen comprising atmosphere.

3. The method according to claim 2, wherein the compound comprising M" in either one of steps A1) and B1) is either one or more of an oxide, a sulfate, a hydroxide and a carbonate, and M" is either one or more of the elements Al, Ca, Ti, Mg, W, Zr, B, Nb and Si.

4. The method according to claim 3, wherein the compound comprising M" is a nanometric alumina powder having a D50 of inferior to 100 nm and a surface area of at least 50 $m^2/g$.

5. The method according to claim 2, wherein the fluorine-containing polymer in step B1) is either one of a PVDF homopolymer, a PVDF copolymer, a PVDF-HFP polymer (hexa-fluoro propylene) and a PTFE polymer, and wherein the amount of fluorine-containing polymer in the fourth mixture is between 0.1 wt % and 2 wt %.

6. The method according to claim 2 comprising steps C1) and C2), wherein M"=Li, and in step C1) the inorganic oxidizing chemical compound is $NaHSO_5$, or either one of a chloride, a chlorate, a perchlorate and a hypochloride of either one of potassium, sodium, lithium, magnesium and calcium, and the Li-acceptor chemical is either one of $AlPO_4$, $Li_3AlF_6$ and $AlF_3$.

7. The method according to claim 2 comprising steps C1) and C2), wherein M"=Li, and in step C1) both the inorganic oxidizing chemical compound and the Li-acceptor chemical are the same compound, being either one of $Li_2S_2O_8$, $H_2S_2O_8$, and $Na_2S_2O_8$.

8. The method according to claim 2 comprising steps C1) and C2), wherein in step C1) a nanosized $Al_2O_3$ powder is provided as a further Li-acceptor chemical.

9. The method according to claim 1, wherein through the rotary kiln an air flow is applied between 0.5 $m^3/kg$ and 3.5 $m^3/kg$.

10. The method according to claim 1, wherein the step of sintering the second mixture is performed in a tray conveyor furnace wherein each tray carries at least 5 kg of mixture.

11. The method according to claim 1, wherein between the step of providing a M'-based precursor and the step of mixing the M'-based precursor with either one of LiOH, $Li_2O$ and $LiOH \cdot H_2O$ the M'-based precursor is subjected to a roasting step at a temperature above 200° C. in a protective atmosphere.

12. The method according to claim 11, wherein the transition metals in the M'-based precursor have a mean oxidation state of superior to 2.5 and wherein the precursor has a content of $H_2O$ of inferior to 15 wt %.

13. The method according to claim 11, wherein the transition metals in the M'-based precursor have a mean oxidation state of superior to 2.7 and wherein the precursor has a content of $H_2O$ of inferior to 5 wt %.

* * * * *